US008663471B1

(12) United States Patent
Barry et al.

(10) Patent No.: US 8,663,471 B1
(45) Date of Patent: *Mar. 4, 2014

(54) APPARATUS AND METHOD FOR TREATING AQUEOUS SOLUTIONS AND CONTAMINANTS THEREIN

(71) Applicant: AquaMost, Inc., Madison, WI (US)

(72) Inventors: Terence P. Barry, Middleton, WI (US); Thomas P. Barry, Madison, WI (US); Jake Myre, Beaver Dam, WI (US); Anton Asmuth, Madison, WI (US)

(73) Assignee: AquaMost, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,993

(22) Filed: May 22, 2013

Related U.S. Application Data

(63) Continuation of application No. 13/796,310, filed on Mar. 12, 2013, and a continuation of application No. 13/689,089, filed on Nov. 29, 2012.

(60) Provisional application No. 61/566,490, filed on Dec. 2, 2011, provisional application No. 61/584,012, filed on Jan. 6, 2012.

(51) Int. Cl.
*B01D 57/02* (2006.01)
*C02F 1/32* (2006.01)

(52) U.S. Cl.
USPC ........... 210/243; 204/272; 204/670; 204/671; 210/748.14; 422/186.3; 250/436

(58) Field of Classification Search
USPC .......... 210/138, 243, 748.1, 748.14; 204/450, 204/518, 600, 157.272, 670, 671; 250/435–438; 422/22, 24, 186, 186.3
See application file for complete search history.

(56) References Cited

U.S. PATENT DOCUMENTS

| | | | | |
|---|---|---|---|---|
| 2,282,024 A | * | 5/1942 | Bitner | 99/451 |
| 4,042,758 A | | 8/1977 | Weinstein et al. | |
| 4,181,593 A | | 1/1980 | McKinzie et al. | |
| 4,349,765 A | | 9/1982 | Brandli | |
| 4,471,036 A | | 9/1984 | Skotheim | |
| 4,521,499 A | | 6/1985 | Switzer | |

(Continued)

FOREIGN PATENT DOCUMENTS

| | | |
|---|---|---|
| CA | 2632788 A1 | 11/2009 |
| CN | 2558656 Y | 6/2002 |

(Continued)

OTHER PUBLICATIONS

Abeysinghe et al., 1996, Biofilters for Water Reuse in Aquaculture, Water Sci. Technol. 34:253-260.

(Continued)

*Primary Examiner* — Joseph Drodge
(74) *Attorney, Agent, or Firm* — Boardman & Clark LLP

(57) ABSTRACT

The present disclosure is generally directed to devices and methods of treating aqueous solutions to help remove or otherwise reduce levels, concentrations or amounts of one or more contaminants. The present disclosure relates to a apparatus including a substantially self-contained housing or container which is adapted to receive components including at least one counterelectrode (e.g. cathode) and at least one photoelectrode (e.g. anode) provided or arranged around at least one UV light source, and/or receive, contain and/or circulate fluid or aqueous solution.

20 Claims, 12 Drawing Sheets

(56) References Cited

U.S. PATENT DOCUMENTS

| | | | |
|---|---|---|---|
| 4,592,807 A | 6/1986 | Switzer | |
| 4,793,910 A | 12/1988 | Smotkin et al. | |
| 5,022,970 A | 6/1991 | Cook | |
| 5,035,784 A | 7/1991 | Anderson | |
| 5,116,582 A * | 5/1992 | Cooper et al. | 422/186.3 |
| 5,137,607 A | 8/1992 | Anderson et al. | |
| 5,215,943 A | 6/1993 | Anderson et al. | |
| 5,227,342 A | 7/1993 | Anderson | |
| 5,308,454 A | 5/1994 | Anderson et al. | |
| 5,439,624 A | 8/1995 | Anderson | |
| 5,449,466 A * | 9/1995 | Peebles et al. | 210/748.14 |
| 5,543,034 A | 8/1996 | Hilbertz | |
| 5,603,843 A | 2/1997 | Snee | |
| 5,616,152 A | 4/1997 | Velasquez | |
| 5,622,791 A | 4/1997 | Shackle | |
| 5,712,037 A | 1/1998 | Anderson | |
| 5,932,111 A * | 8/1999 | Christensen et al. | 210/748.11 |
| 5,935,522 A | 8/1999 | Swerdlow et al. | |
| 5,963,417 A | 10/1999 | Anderson et al. | |
| 6,074,072 A | 6/2000 | Parsons | |
| 6,136,186 A | 10/2000 | Gonzalez-Martin et al. | |
| 6,159,421 A | 12/2000 | Fujii | |
| 6,180,014 B1 | 1/2001 | Salama | |
| 6,218,035 B1 | 4/2001 | Fuglevand et al. | |
| 6,261,464 B1 | 7/2001 | Herrington et al. | |
| 6,379,560 B1 | 4/2002 | Tilp | |
| 6,409,893 B1 | 6/2002 | Holzbock | |
| 6,409,928 B1 | 6/2002 | Gonzalez et al. | |
| 6,524,447 B1 | 2/2003 | Carmignani et al. | |
| 6,547,951 B1 | 4/2003 | Maekawa | |
| 6,645,366 B2 | 11/2003 | Iseki et al. | |
| 7,008,473 B2 | 3/2006 | Butters | |
| 7,230,255 B2 | 6/2007 | Shim | |
| 7,326,330 B2 | 2/2008 | Herrington et al. | |
| 7,425,272 B2 | 9/2008 | Butters et al. | |
| 7,683,343 B2 * | 3/2010 | Schiene et al. | 250/432 R |
| 8,398,828 B1 | 3/2013 | Winkie | |
| 2001/0042682 A1 | 11/2001 | Weres et al. | |
| 2002/0185080 A1 | 12/2002 | Ortiz | |
| 2004/0020861 A1 | 2/2004 | Lehmann et al. | |
| 2004/0022700 A1 | 2/2004 | Kim et al. | |
| 2005/0014066 A1 | 1/2005 | Shimamune | |
| 2005/0249659 A1 | 11/2005 | Flynn et al. | |
| 2006/0123885 A1 | 6/2006 | Yates et al. | |
| 2006/0124442 A1* | 6/2006 | Valpey et al. | 204/157.15 |
| 2006/0144700 A1 | 7/2006 | Carson et al. | |
| 2007/0020158 A1 | 1/2007 | Kuramoto et al. | |
| 2007/0131621 A1 | 6/2007 | Denton | |
| 2007/0251811 A1 | 11/2007 | Sahle-Demessie et al. | |
| 2007/0272877 A1* | 11/2007 | Tribelsky et al. | 250/431 |
| 2008/0050471 A1 | 2/2008 | Omasa | |
| 2008/0121531 A1 | 5/2008 | Anderson et al. | |
| 2009/0130748 A1 | 5/2009 | Uphoff | |
| 2009/0154060 A1 | 6/2009 | Anderson et al. | |
| 2009/0314711 A1 | 12/2009 | Barry et al. | |
| 2009/0320894 A1 | 12/2009 | Angluli et al. | |
| 2010/0201239 A1 | 8/2010 | Mostoller et al. | |
| 2010/0209294 A1 | 8/2010 | Owen et al. | |
| 2010/0270167 A1 | 10/2010 | McFarland | |
| 2010/0294726 A1 | 11/2010 | Butters et al. | |
| 2011/0180423 A1 | 7/2011 | Barry et al. | |
| 2012/0031852 A1 | 2/2012 | Aglietto | |

FOREIGN PATENT DOCUMENTS

| | | |
|---|---|---|
| CN | 1538939 A | 8/2002 |
| CN | 201031159 Y | 3/2007 |
| CN | 101033105 A | 9/2007 |
| CN | 101172674 A | 10/2007 |
| CN | 100558652 C | 11/2007 |
| CN | 101219371 A | 7/2008 |
| CN | 101543771 A | 9/2009 |
| CN | 101584996 A | 11/2009 |
| CN | 101913678 A | 8/2010 |
| CN | 101863548 A | 10/2010 |
| DE | 19602947 A1 | 1/1996 |
| EP | 2394963 A1 | 12/2011 |
| JP | 7-39273 | 2/1995 |
| JP | 2000-201569 A | 7/2000 |
| JP | 2000-210570 A | 8/2000 |
| JP | 2001-29747 A | 2/2001 |
| JP | 2001-62469 A | 3/2001 |
| JP | 2001-136862 A | 5/2001 |
| JP | 2001-170204 A | 6/2001 |
| JP | 2002-59177 A | 2/2002 |
| JP | 2003-190777 A | 7/2003 |
| JP | 2003-200043 A | 7/2003 |
| JP | 2003-200178 A | 7/2003 |
| JP | 2004-154742 A | 6/2004 |
| JP | 2005-152815 A | 6/2005 |
| JP | 2005-193216 A | 7/2005 |
| JP | 2006-61886 A | 3/2006 |
| JP | 2006-230345 | 9/2006 |
| JP | 2006-526500 A | 11/2006 |
| JP | 2007-69124 A | 3/2007 |
| JP | 2007-167029 A | 7/2007 |
| JP | 2011-55795 A | 3/2011 |
| KR | 10-2010-0003902 | 1/2010 |
| KR | 20-2011-0010953 | 11/2011 |
| WO | WO 2006/027659 | 3/2006 |

OTHER PUBLICATIONS

Asadi et al., 2006, Degradation of Aqueous Methyl tert-Butyl Ether by Photochemical, Biological, and Their Combined Processes, Int'l. Journal of Photoenergy, 2006: 1-7.

Baram et al., 2009, Enhanced inactivation of *E. coli* bacteria using immobilized porous TiO2 photoelectrocatalysis, Electrochimica Acta 54 (2009) 3381-3386.

Barreto et al., 1995, Photocatalytic Degradation of Methyl-tert-Butyl Ether in TiO2 Slurries: A Proposed Reaction Scheme, Wat. Res. vol. 29, No. 5, pp. 1243-1248.

Bradley et al., 1999, Aerobic Mineralization of MTBE and tert-Butyl Alcohol by Stream-Bed Sediment Microorganisms, Environ. Sci. Technol. 33:1877-1879.

Candal et al., 1998, TiO2-Mediated Photoelectrocatalytic Purification of Water, J. Adv. Oxid. Technol. vol. 3, No. 3, pp. 270-276.

Candal et al., 1999, Titanium-Supported Titania Photoelectrodes Made by Sol-Gel Processes, J. of Env. Engin., October, pp. 906-912.

Candal et al., 2000, Effects of pH & Applied Pot. on Photocurrent and Oxid. Rate of Saline Solns. of Formic Acid in a Photoelectrocat. Reactor, Env. Sci. Tech. 34:3443-3451.

Cater et al., 2000, UV/H202 Treatment of Methyl tert-Butyl Ether in Contaminated Waters, Environ. Sci. Technol. 34: 659-662.

Chang et al., 2000, Kinetics of Methyl Tert-Butyl Ether Degradation & By-Product Formation During UV/Hydrogen Peroxide Water Treatment, Water Res. vol. 34, No. 8,p. 2223-2340.

Chen, 2004, Electrochemical Technologies in Wastewater Treatment, Sep. Purif. Technol. 38:11-41.

Cheng et al., 2007, Models of Hypochlorite production in electrochemical reactors with plate and porous anodes, J Appl Electrochem 37:1203-1217.

Chiang et al., 1996, Photodegradation of Chlorinated Organic Wastes with n-TiO2 Promoted by P-CuO, Journal of the Chinese Chemical Society, 43: 21-27.

Chiang et al., 1995, Indirect Oxidation Effects in Electrochemical Oxidation Treatment of Landfill Leachate, Water Res. 29:671-678.

Cho et al., 2008, Meas. of OH radical CT for inactivating Cryptosporidium parvum using photo/ferrioxalate and photo/TiO2 systems, Jrnl. of Applied Microbiology, 104: 759-766.

Cho et al., 2010, Mechanisms of *Escherichia coli* inactivation by several disinfectants, Water Research 44: 3410-3418.

Christensen et al., 2003, Photoelectrocatalytic and photocatalytic disinfection of *E. coli* suspensions by titanium dioxide, Applied Catalysis B: Environmental 41: 371-386.

Church et al., 1997, Method for Determination of Methyl tert-Butyl Ether and Its Degradation Products in Water, Environmental Science & Technology, 31: 3723-3726.

(56) References Cited

OTHER PUBLICATIONS

Chu et al., 2004, The photocatalytic degradation of dicamba in TiO2 suspensions with the help of hyd. perox. by different near UV irradiations, Water Research 38:1037-1043.
Clancy et al., 2000, Using UV to Inactivate Cryptosporidium, American Water Works Association Journal; Sep., pp. 97-104, 107.
Cooper et al., 1994, Process Options for Phosphorus and Nitrogen Removal from Wastewater, J. Inst. Water Envrion. Manag. 8:84-92.
Crittenden et al., 1996, Solar detoxification of fuel-contaminated groundwater using fixed-bed photocatalysts, Water Environment Resesrch, vol. 68, No. 3, pp. 270-278.
Czarnetzki, et al., 1992, Formation of Hypochlorite, Chlorate, and Oxygen During NaCl Electrolysis from Alkaline-Solutions at a RuO2/TiO2 Anode, J. Appl. Eletchem. 22:315-324.
Davis et al., 2000, Alternative Sorbents for Removing MTBE from Gasoline-Contaminated Groundwater, J. Environ. Eng., 126: 354.
Delos Reyes, et al., 1996, Combination of a Bead Filter and Rotating Biological Contactor in a Recirculating Fish Culture System, Aquacultural Engineering vol. 15, pp. 27-39.
Dunlop et al., 2008, Photocatalytic inactivation of Clostridium perfringens spores on TiO2 electrodes, Journal of Photochemistry and Photobiology A: Chemistry 196: 113-119.
Egerton et al., 2006, Photoelectrocatalysis by titanium dioxide for water treatment, Int. J. Environment and Pollution, vol. 27, Nos. 1/2/3, pp. 2-19.
Eslami et al., 2008, Photocatalytic Degradation of methyl tert-butyl ether (MTBE) in Contaminated Water by ZnO Nanoparticles, J Chem Technol Biotechnol 83:1447-1453.
Fraga et al., 2009, Evaluation of the photoelectrocatalytic method for oxidi. chl. & simult. removal of microcystin toxins in surface waters, Electrochimica Acta 54:2069-2076.
Fujishima et al., 1998, Interfacial photochemistry: Fundamentals and applications, Pure & Appl. Chem.,vol. 70, No. 11, pp. 2177-2187.
Garrett et al., 1986, MTBE As Grd. Water Contam., Procds. Of MWWA/API Conf. on Petro. Hydrocarb. & Org. Chem. in Grd. Water, Hou. Tex. Nov. 12-14, Dublin, OH, NWWA, p. 227-238.
Gerischer, 1993,Photoelectrochemical Catalysis of the Oxidation of Organic Mol. by Oxygen on Small Semiconductor Particles with TiO2 as an Example, Electrochimica Acta, 38:3-9.
Gupta et al., 1995, Toxicity of Methyl Tertiary Butyl Ether to Daphnia Magna and Photobacterium phosphoreum, Bull. Environ. Contam. Toxicol., 55:618-620.
Helmer et al., 1998, Simultaneous Nitrificationidenitrification in an Aerobic Biofilm System, Wat. Sci. Tech., vol. 37. No. 4-5. pp. 183-187.
Hoffman et al., 1994, Photocatalytic Production of H2O2 and Organic Peroxide on Quantum-Sized Semiconductor Colloids, Environ. Sci. Technol. 28: 776-785.
Hoffman et al., 1995, Environmental Applications of Semiconductor Photocatalysis, Chem. Rev. 1995, 95, pp. 69-96.
Ip et al., 2001, Ammonia Toxicity, Tolerance, and Excretion, Fish Physiology, vol. 20: Nitrogen Excretion, pp. 109-148.
Johnson et al., 2000, MTBE to What Extent Will Past Releases Contaminate Community Water Supply Wells?, Environmental Science & Technology, May 1, 2000, pp. 2-9.
Kaneko et al., 2006, Photoelectrochemical reaction of biomass & bio-related compounds w/ nanoporous TiO2 film photoanode and O2-reducing cathode, Electrochem. Comm. 8:336-340.
Keller, et al., 1998, An integral cost-benefit analysis of gaso. form. mtg. Cali. Phase II Reformulated Gaso. requirements, Cost-Benefit Analysis of Gaso. Formu., pp. 1-56.
Kim et al., 1994, Photoelectrocatalytic Degradation of Formic Acid Using a Porous TiO2 Thin-Film Electrode, Environ. Sci. Technol. 1994, 28:479-483.
Kim et al., 1995, Effects of Firing Temperature on Photocatalytic and Photoelectrocatalytic Properties of Ti02, J. Environ. Engin., Aug. 1995, pp. 590-594.
Knudson, 1985, Photoreactivation of UV-Irradiated Legionella pneumophila and Other Legionella Species, Applied and Environmental Microbiology, vol. 49, No. 4, p. 975-980.
Kropp et al., 2009, A device that converts aqueous ammonia into nitrogen gas, Aquacultural Engineering 41 (2009) pp. 28-34.
Lee et al., 2002, Residual Chlorine Distribution and Disinfection during Electrochemical Removal of Dilute Ammonia from an Aqueous Solution, J. Chem. Eng. Japan, 35:285-289.
Li et al., 2005, Photoelectrocatalytic degradation of bisphenol A in aqueous solution using a Au—TiO2/ITO film, Journal of Applied Electrochemistry (2005) 35:741-750.
Liang, et al., 1999, Oxidation of MTBE by Ozone and Peroxone Processes, J. Am. Water Works Assoc. vol. 91, Issue 6, pp. 104-114.
Lin, et al., 1996, Photodegradation of Aroclor 1254 Using Simulated Sunlight and Various Sensitizers, Bull. Environ. Contam. Toxicol. (1996) 56:566-570.
Lin, et al., 1997, Electrochemical Nitrite and Ammonia Oxidation in Sea Water, J. Environ. Sci. Health, A32(8), 2125-2138.
Lin, et al., 1996, Electrochemical Removal of Nitrite and Ammonia for Aquaculture, Wat. Res. vol. 30, pp. 715-721.
Long et al., 2004, A comparison of the survival of F+RNA and F+DNA coli phages in lake water microcosms, J. Water and Health, vol. 2, Issue: 1, Mar. 2004, pp. 15-22.
Malone et al., 2000, Use of Floating Bed Filters to Recondition Recirculating Waters in Warm Water Aquaculture Product Systems, Aquacul. Eng. 22:57-73.
Mamane et al., 2007, Inactivation of *E. coli, B. subtilis* spores, and MS2, T4, and T7 phage using UV/H2O2 advanced oxidation, Journal of Hazardous Materials 146 (2007) 479-486.
Matthews, 1988, An Adsorption Water Purifies with in Situ Photocatalytic Regeneration, Journal of Catalysis 113: 549-555.
Matthews, 1988, Kinetics of Photocatalytic Oxidation of Organic Solutes over Titanium Dioxide, Journal of Catalysis 111: 264-272.
Matthews, 1986, Photo-Oxidation of Organic Material in Aqueous Suspensions of Titanium Dioxide, Wat. Res. vol. 20, No. 5, pp. 569-578.
McClure et al., 2000, A big advance in cleaning up small MTBE levels, Environmental Protection, May 2000, pp. 20, 22-25.
Mofidi et al., 2002,the effect of UV light on the inactivation of *Giardia lamblia & Giardia muris* cysts as determined by animal infectivity assay, Water Research 36:2098-2108.
Ollis et al., 1991, Destruction of Water Contaminants, Environ. Sci. Technol., vol. 25, No. 9, 1991, pp. 1522-1529.
Pavasupree et al., 2006, Structural, Photocatalytic Activity & Photovoltaic Prop. of Mesoporous Anatase Titania Nanopowders Prep. By Hydrothermal Method, Nov. 21-23 Thailand.
Pereira et al., 2008, Comparing Efficacy of Cl., ClO2, & O3 in Inactivation of Cryptosporidium parvumin Water from Parana State, S. Brazil, Appl Biochem Biotechnol 151:464-473.
Randall, et al., 2002, Ammonia Toxicity in Fish, Marine Pollution Bulletin 45:17-23.
Rice et al., 1999, Chlorine Inactivation of *Escherichia coli* O157:H7, Emerging Infectious Diseases, vol. 5, No. 3., May-Jun. 1999, pp. 461-463.
Russo et al., 1991, Toxicity of Ammonia, Nitrite, and Nitrate to Fishes, Aquaculture and Water Quality, pp. 58-89.
Sakulkhaemaruethai et al., 2005, Photocatalytic activity of titania nanocrystals prep. by surfactant-assisted templating method . . . , Materials Letters 59: 2965-2968.
Selcuk et al., 2005, Effect of pH, charge separation and ox. concentration in photoelectric. systems: active chlorine production & chlorate formation, Deslination, 176:219-227.
Selli et al., 2005, Degradation of methyl tert-butyl ether in water: effects of the combined use of sonolysis and photocatalysis, Ultrasonics Sonochemistry 12 (2005) 395-400.
Shang et al., 2007,MS2 Coliphage Inactivation with UV Irradiation and Free Chlorine/Monochloramine, Environmental Engineering Science, vol. 24, No. 9, pp. 1321-1332.
Squillace et al., 1996, Environmental Behavior and Fate of Methyl tert-Butyl Ether (MTBE), U.S. Geological Survey-NAWQA, pp. 1-6.
Stefan et al., 2000, Degradation Pathways during the Treatment of Methyl tert-Butyl Ether by the UV/H2O2 Process, Environ. Sci. Technol. 2000, 34:650-658.
Sun et al.,1998, Kinetics & Mechanism of Photoelect. Oxid. Nitrite Ion by Using Rutile Form TiO2/Ti Photoele. w/ High Electric Field Enhan., Ind. Eng. Chem. Res. 37:4207-4214.

(56) References Cited

OTHER PUBLICATIONS

Thompson et al., 2003, Detection of Infectious Human Adenoviruses in Tertiary-Treated and Ultraviolet-Disinfected Wastewater, Water Environment Research, 75:163-170.
Tomasso, 1994, Toxicity of Nitrogeneous Wastes to Aquaculture Animals, Reviews in Fisheries Science, 2(4): 291-314.
USEPA, Dec. 1997, Drinking Water Advisory: Consumer Acceptability Advice and Health Effects Analysis on Methyl Tertiary-Butyl Ether (MtBE), EPA-822-F-97-OO9, pp. 1-42.
USEPA, Jun. 2003, Ultraviolet Disinfection Guidance Manual, EPA-815-D-03-007, pp. 1-556.
USEPA, 2008, Rules Part 141—National Primary Drinking Water Regulations.
Van Rijn J, 1996, The Potential for Integrated Biological Treatment Systems in Recirculating Fish Culture—A Review, Aquaculture 139 (1996) 181-201.
Venkatesan et al., 2008, Isolation & Detection Indicator MS2 Coliphage different environ. & sea goods by PEG Precip. & GAC-UAPB-RT-PCR Meth, Adv. Biotech, Jul. 2008, pp. 26-32.
Vinodgopal, et al., 1993, Electrochem. Assist. Photocat. TiO2 Part. Film Elect. for Photocat. Degrad. Of 4-Chlorophenol, J. Phys. Chem. 97:9040-9044.
Vinodgopal, et al., 1996, Nano. Semi. Films for Photocat.: Photoelec. Behav. of SnO2/TiO2 Comp. Sys. & its Role in Photocata. Degrad. of Text. Azo Dye, Chem. Mat. 8:2180-2187.
Wilkinson, 1961, A Simple Method for Determining Rate Constants and Orders of Reaction, Chemistry and Industry, pp. 1395-1397.
Wolfe et al., 1989, Inactivation of Giardia murls and Indicator Organisms Seeded in Surface Water Supplies by PEROXONE and Ozone, Environ. Sci. Technol. 1989, 23:744-745.
Zang et al., 2005, Photocatalytic Decomposition of Methyl Tert-Butyl Ether in Aqueous Slurry of Titanium Dioxide, Applied Catalysis B: Environmental 57 (2005) 275-282.
Zanoni et al., 2004, Photoelectrocatalytic Production of ACtive Chlorine on Nanocrystalline Titanium Dioxide Thin-Film Electrodes, Environ. Sci. Technol. 38:3203-3208.
International Search Report and Written Opinion of the International Searching Authority for PCT/US2013/020308 filed Jan. 4, 2013.
International Search Report and Written Opinion of the International Searching Authority for PCT/US2012/067083 filed Nov. 29, 2012.
Translated Abstract for KR1020040066971 published Jul. 30, 2004, to Kim et al.
Amendment and Response to Office Action dated Nov. 1, 2011 for U.S. Appl. No. 12/369,219.
USPTO Final Office Action dated Nov. 1, 2011 for U.S. Appl. No. 12/369,219.
Amendment and Response to Office Action dated Jun. 16, 2011 for U.S. Appl. No. 12/369,219.
USPTO Nonfinal Office Action dated Jun. 16, 2011 for U.S. Appl. No. 12/369,219.
USPTO Nonfinal Office Action dated Feb. 25, 2013 for U.S. Appl. No. 12/977,347.
Amendment and Response to Office Action dated Feb. 25, 2013 for U.S. Appl. No. 12/977,347.
International Search Report and Written Opinion of the International Searching Authority dated Feb. 6, 2013 received in PCT/US12/67083 filed Nov. 29, 2012.
International Search Report and Written Opinion of the International Searching Authority dated Feb. 15, 2013 received in PCT/US13/20308 filed Jan. 4, 2013.

\* cited by examiner

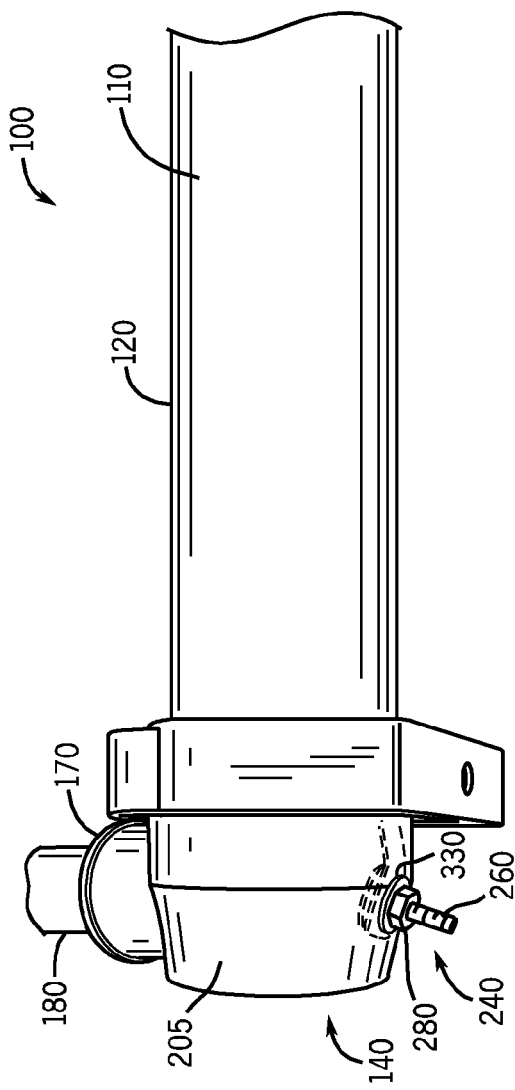
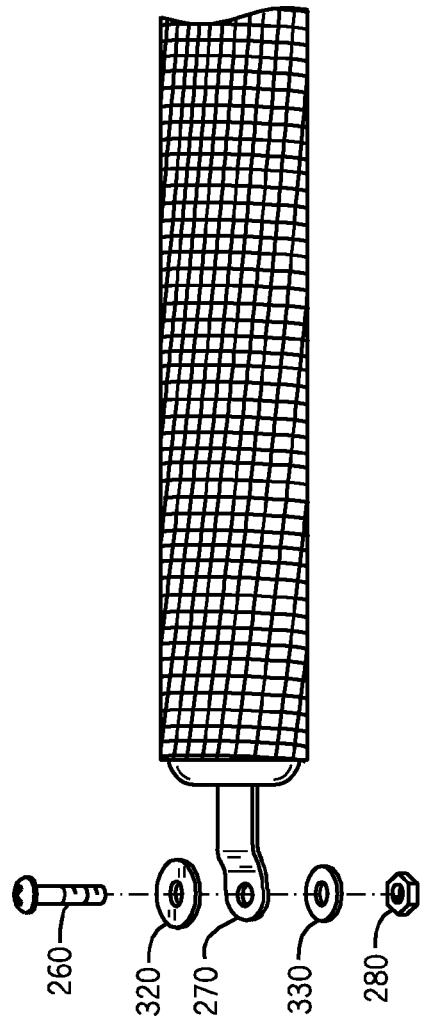

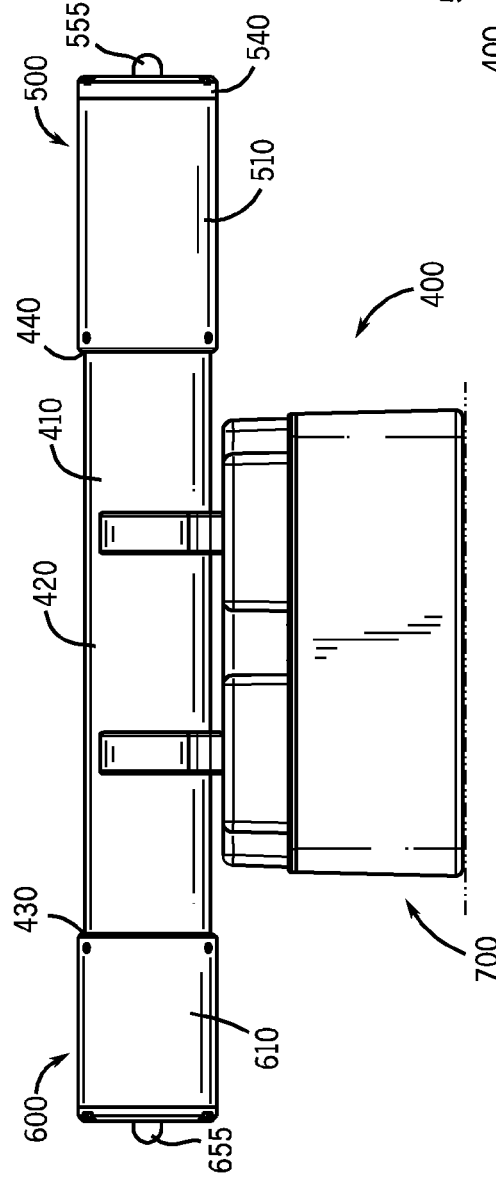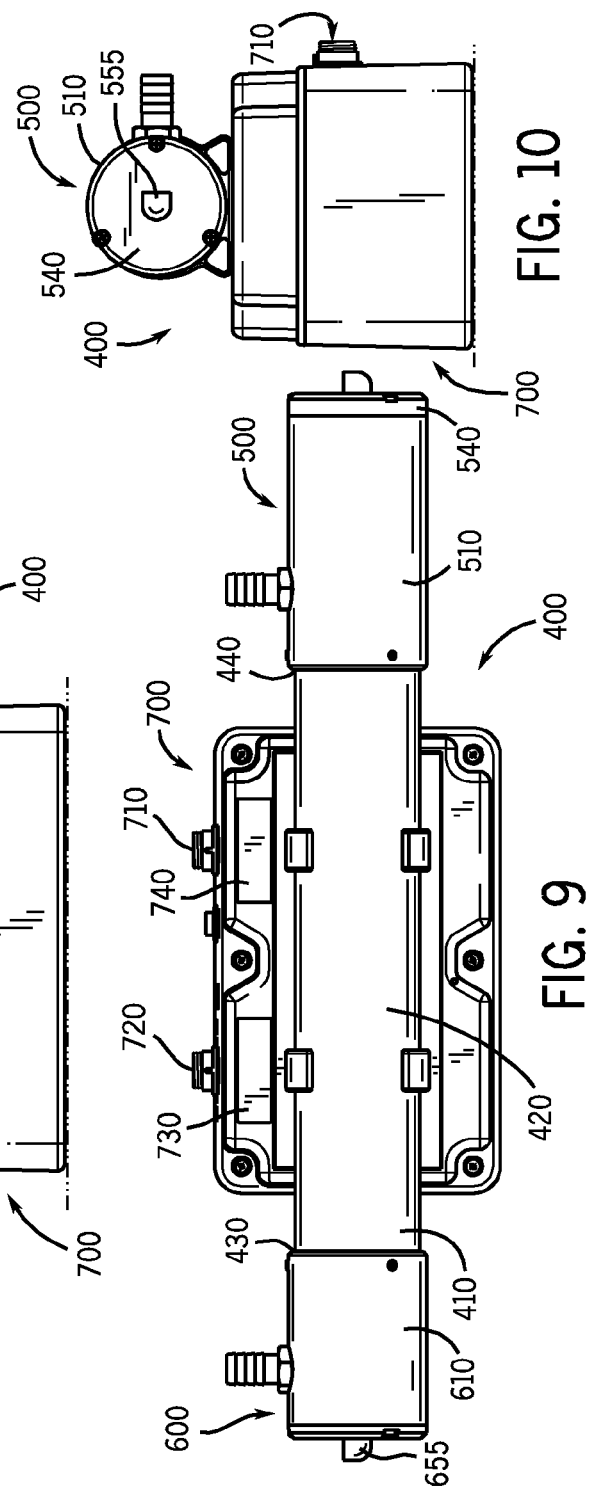

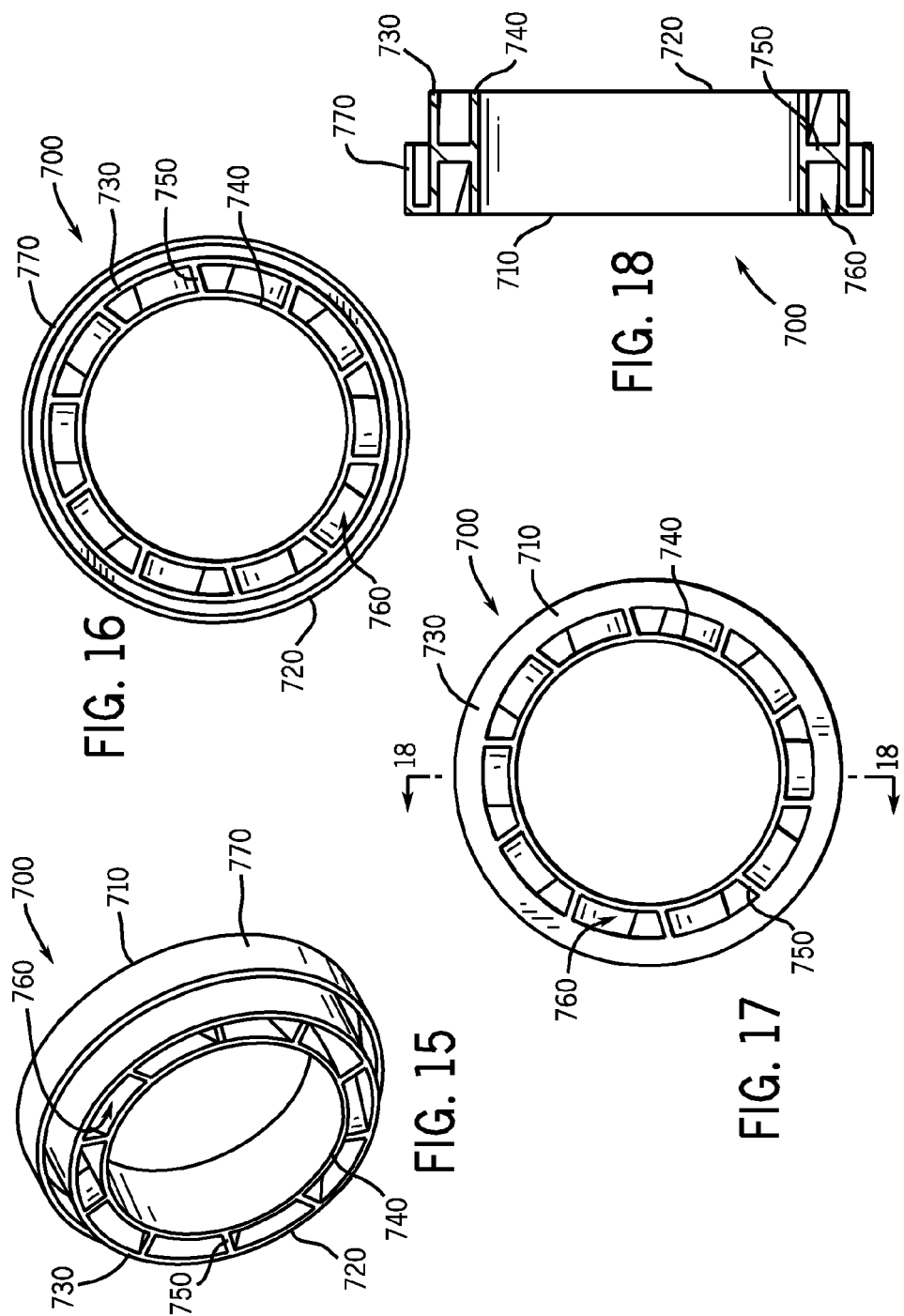

APPARATUS AND METHOD FOR TREATING AQUEOUS SOLUTIONS AND CONTAMINANTS THEREIN

CROSS REFERENCE TO RELATED APPLICATIONS

This application claims priority as a continuation application to U.S. patent application Ser. No. 13/796,310 filed Mar. 12, 2013, which claims priority to and benefit of U.S. patent application Ser. No. 13/689,089 filed Nov. 29, 2012, which claims priority to and benefit of U.S. Provisional Patent Application Ser. No. 61/566,490, filed Dec. 2, 2011, and U.S. Provisional Patent Application Ser. No. 61/584,012, filed Jan. 6, 2012, each of which is hereby incorporated herein by reference in its entirety.

BACKGROUND

Aqueous solutions often contain one or more contaminants. Such aqueous solutions include, but are not limited to, hydraulic fracturing fluid, hydraulic fracturing backflow water, high-salinity solutions, groundwater, seawater, wastewater, drinking water, aquaculture (e.g., aquarium water and aquaculture water), ballast water, and textile industry dye waste water. Further information of example aqueous solutions follows.

Hydraulic fracturing fluid includes any fluid or solution utilized to stimulate or produce gas or petroleum, or any such fluid or solution after it is used for that purpose.

Groundwater includes water that occurs below the surface of the Earth, where it occupies spaces in soils or geologic strata. Groundwater may include water that supplies aquifers, wells and springs.

Wastewater may be any water that has been adversely affected in quality by effects, processes, and/or materials derived from human or non-human activities. For example, wastewater may be water used for washing, flushing, or in a manufacturing process, that contains waste products. Wastewater may further be sewage that is contaminated by feces, urine, bodily fluids and/or other domestic, municipal or industrial liquid waste products that is disposed of (e.g., via a pipe, sewer, or similar structure or infrastructure or via a cesspool emptier). Wastewater may originate from blackwater, cesspit leakage, septic tanks, sewage treatment, washing water (also referred to as "graywater"), rainfall, groundwater infiltrated into sewage, surplus manufactured liquids, road drainage, industrial site drainage, and storm drains, for example.

Drinking water includes water intended for supply, for example, to households, commerce and/or industry. Drinking water may include water drawn directly from a tap or faucet. Drinking water may further include sources of drinking water supplies such as, for example, surface water and groundwater.

Aquarium water includes, for example, freshwater, seawater, and saltwater used in water-filled enclosures in which fish or other aquatic plants and animals are kept or intended to be kept. Aquarium water may originate from aquariums of any size such as small home aquariums up to large aquariums (e.g., aquariums holding thousands to hundreds of thousands of gallons of water).

Aquaculture water is water used in the cultivation of aquatic organisms. Aquaculture water includes, for example, freshwater, seawater, and saltwater used in the cultivation of aquatic organisms.

Ballast water includes water, such as freshwater and seawater, held in tanks and cargo holds of ships to increase the stability and maneuverability during transit. Ballast water may also contain exotic species, alien species, invasive species, and/or nonindiginous species of organisms and plants, as well as sediments and contaminants.

A contaminant may be, for example, an organism, an organic chemical, an inorganic chemical, and/or combinations thereof. More specifically, "contaminant" may refer to any compound that is not naturally found in an aqueous solution. Contaminants may also include microorganisms that may be naturally found in an aqueous solution and may be considered safe at certain levels, but may present problems (e.g., disease and/or other health problems) at different levels. In other cases (e.g., in the case of ballast water), contaminants also include microorganisms that may be naturally found in the ballast water at its point of origin, but may be considered non-native or exotic species. Moreover, governmental agencies such as the United States Environmental Protection Agency, have established standards for contaminants in water.

A contaminant may include a material commonly found in hydraulic fracturing fluid before or after use. For example, the contaminant may be one or more of the following or combinations thereof: diluted acid (e.g., hydrochloric acid), a friction reducer (e.g., polyacrylamide), an antimicrobial agent (e.g. glutaraldehyde, ethanol, and/or methanol), scale inhibitor (e.g. ethylene glycol, alcohol, and sodium hydroxide), sodium and calcium salts, barium, oil, strontium, iron, heavy metals, soap, bacteria, etc. A contaminant may include a polymer to thicken or increase viscosity to improve recovery of oil. A contaminant may also include guar or guar gum, which is commonly used as a thickening agent in many applications in oil recovery, the energy field, and the food industry.

A contaminant may be an organism or a microorganism. The microorganism may be for example, a prokaryote, a eukaryote, and/or a virus. The prokaryote may be, for example, pathogenic prokaryotes and fecal coliform bacteria. Example prokaryotes may be *Escherichia, Brucella, Legionella*, sulfate reducing bacteria, acid producing bacteria, Cholera bacteria, and combinations thereof.

Example eukaryotes may be a protist, a fungus, or an algae. Example protists (protozoans) may be Giardia, Cryptosporidium, and combinations thereof. A eukaryote may also be a pathogenic eukaryote. Also contemplated within the disclosure are cysts of cyst-forming eukaryotes such as, for example, Giardia.

A eukaryote may also include one or more disease vectors. A "disease vector" refers any agent (person, animal or microorganism) that carries and transmits an infectious pathogen into another living organism. Examples include, but are not limited to, an insect, nematode, or other organism that transmits an infectious agent. The life cycle of some invertebrates such as, for example, insects, includes time spent in water. Female mosquitoes, for example, lay their eggs in water. Other invertebrates such as, for example, nematodes, may deposit eggs in aqueous solutions. Cysts of invertebrates may also contaminate aqueous environments. Treatment of aqueous solutions in which a vector (e.g., disease vector) may reside may thus serve as a control mechanism for both the disease vector and the infectious agent.

A contaminant may be a virus. Example viruses may include a waterborne virus such as, for example, enteric viruses, hepatitis A virus, hepatitis E virus, rotavirus, and MS2 coliphage, adenovirus, and norovirus.

A contaminant may include an organic chemical. The organic chemical may be any carbon-containing substance according to its ordinary meaning. The organic chemical may be, for example, chemical compounds, pharmaceuticals, over-the-counter drugs, dyes, agricultural pollutants, industrial pollutants, proteins, endocrine disruptors, fuel oxygenates, and/or personal care products. Examples of organic chemicals may include acetone, acid blue 9, acid yellow 23, acrylamide, alachlor, atrazine, benzene, benzo(a)pyrene, bromodichloromethane, carbofuran, carbon tetrachloride, chlorobenzene, chlordane, chloroform, chloromethane, 2,4-dichlorophenoxyacetic acid, dalapon, 1,2-dibromo-3-chloropropane, o-dichlorobenzene, p-dichlorobenzene, 1,2-dichloroethane, 1,1-dichloroethylene, cis-1,2-dichloroethylene, trans-1,2-dichloroethylene, dichlormethane, 1,2-dichloropropane, di(2-ethylhexyl) adipate, di(2-ethylhexyl) phthalate, dinoseb, dioxin (2,3,7,8-TCDD), diquat, endothall, endrin, epichlorohydrin, ethylbenzene, ethylene dibromide, glyphosate, a haloacetic acid, heptachlor, heptachlor epoxide, hexachlorobenzene, hexachlorocyclopentadiene, lindane, methyl-tertiary-butyl ether, methyoxychlor, napthoxamyl (vydate), naphthalene, pentachlorophenol, phenol, picloram, isopropylbenzene, N-butylbenzene, N-propylbenzene, Sec-butylbenzene, polychlorinated biphenyls (PCBs), simazine, sodium phenoxyacetic acid, styrene, tetrachloroethylene, toluene, toxaphene, 2,4,5-TP (silvex), 1,2,4-trichlorobenzene, 1,1,1-trichloroethane, 1,1,2-trichloroethane, trichloroethylene, a trihalomethane, 1,2,4-trimethylbenzene, 1,3,5-trimethylbenzene, vinyl chloride, o-xylene, m-xylene, p-xylene, an endocrine disruptor, a G-series nerve agent, a V-series nerve agent, bisphenol-A, bovine serum albumin, carbamazepine, cortisol, estradiol-17β, gasoline, gelbstoff, triclosan, ricin, a polybrominated diphenyl ether, a polychlorinated diphenyl ether, and a polychlorinated biphenyl. Methyl tert-butyl ether (also known as, methyl tertiary-butyl ether) is a particularly applicable organic chemical contaminant.

A contaminant may include an inorganic chemical. More specifically, the contaminant may be a nitrogen-containing inorganic chemical such as, for example, ammonia ($NH_3$) or ammonium ($NH_4$). Contaminants may include non-nitrogen-containing inorganic chemicals such as, for example, aluminum, antimony, arsenic, asbestos, barium, beryllium, bromate, cadmium, chloramine, chlorine, chlorine dioxide, chlorite, chromium, copper, cyanide, fluoride, iron, lead, manganese, mercury, nickel, nitrate, nitrite, selenium, silver, sodium, sulfate, thallium, and/or zinc.

A contaminant may include a radionuclide. Radioactive contamination may be the result of a spill or accident during the production or use of radionuclides (radioisotopes). Example radionuclides include, but are not limited to, an alpha photon emitter, a beta photon emitter, radium 226, radium 228, and uranium.

Various methods exist for handling contaminants and contaminated aqueous solutions. Generally, for example, contaminants may be contained to prevent them from migrating from their source, removed, and immobilized or detoxified.

Another method for handling contaminants and contaminated aqueous solutions is to treat the aqueous solution at its point-of-use. Point-of-use water treatment refers to a variety of different water treatment methods (physical, chemical and biological) for improving water quality for an intended use such as, for example, drinking, bathing, washing, irrigation, etc., at the point of consumption instead of at a centralized location. Point-of-use treatment may include water treatment at a more decentralized level such as a small community or at a household. A drastic alternative is to abandon use of the contaminated aqueous solutions and use an alternative source.

Other methods for handling contaminants and contaminated aqueous solutions are used for removing gasoline and fuel contaminants, and particularly the gasoline additive, MTBE. These methods include, for example, phytoremediation, soil vapor extraction, multiphase extraction, air sparging, membranes (reverse osmosis), and other technologies. In addition to high cost, some of these alternative remediation technologies result in the formation of other contaminants at concentrations higher than their recommended limits. For example, most oxidation methods of MTBE result in the formation of bromate ions higher than its recommended limit of 10 μg/L in drinking water (Liang et al., "Oxidation of MTBE by ozone and peroxone processes," J. Am. Water Works Assoc. 91:104 (1999)).

A number of technologies have proven useful in reducing MTBE contamination, including photocatalytic degradation with UV light and titanium dioxide (Barreto et al., "Photocatalytic degradation of methyl tert-butyl ether in $TiO_2$ slurries: a proposed reaction scheme," Water Res. 29:1243-1248 (1995); Cater et al., $UV/H_2O_2$ treatment of MTBE in contaminated water," Environ. Sci Technol. 34:659 (2000)), oxidation with UV and hydrogen peroxide (Chang and Young, "Kinetics of MTBE degradation and by-product formation during UV/hydrogen peroxide water treatment," Water Res. 34:2223 (2000); Stefan et al., Degradation pathways during the treatment of MTBE by the $UV/H_2O_2$ process," Environ. Sci. Technol. 34:650 (2000)), oxidation by ozone and peroxone (Liang et al., "Oxidation of MTBE by ozone and peroxone processes," J. Am. Water Works Assoc. 91:104 (1999)) and in situ and ex situ bioremediation (Bradley et al., "Aerobic mineralization of MTBE and tert-Butyl alcohol by stream bed sediment microorganisms," Environ. Sci. Technol. 33:1877-1879 (1999)).

Use of titanium dioxide (titania, $TiO_2$) as a photocatalyst has been shown to degrade a wide range of organic pollutants in water, including halogenated and aromatic hydrocarbons, nitrogen-containing heterocyclic compounds, hydrogen sulfide, surfactants, herbicides, and metal complexes (Matthews, "Photo-oxidation of organic material in aqueous suspensions of titanium dioxide," Water Res. 220:569 (1986); Matthews, "Kinetic of photocatalytic oxidation of organic solutions over titanium-dioxide," J. Catal. 113:549 (1987); 011 is et al., "Destruction of water contaminants," Environ. Sci. Technol. 25:1522 (1991)).

Irradiation of a semiconductor photocatalyst, such as titanium dioxide ($TiO_2$), zinc oxide, or cadmium sulfide, with light energy equal to or greater than the band gap energy (Ebg) causes electrons to shift from the valence band to the conduction band. If the ambient and surface conditions are correct, the excited electron and hole pair can participate in oxidation-reduction reactions. The oxygen acts as an electron acceptor and forms hydrogen peroxide. The electron donors (i.e., contaminants) are oxidized either directly by valence band holes or indirectly by hydroxyl radicals (Hoffman et al., "Photocatalytic production of $H_2O_2$ and organic peroxide on quantum-sized semi-conductor colloids," Environ. Sci. Technol. 28:776 (1994)). Additionally, ethers can be degraded oxidatively using a photocatalyst such as $TiO_2$ (Lichtin et al., "Photopromoted titanium oxide-catalyzed oxidative decomposition of organic pollutants in water and in the vapor phase," Water Pollut. Res. J. Can. 27:203 (1992)). A reaction scheme for photocatalytically destroying MTBE using UV and $TiO_2$ has been proposed, but photodegradation took place only in the presence of catalyst, oxygen, and near UV irradiation and MTBE was converted to several intermediates (tertiary-butyl formate, tertiary-butyl alcohol, acetone, and alpha-hydroperoxy MTBE) before complete mineralization (Barreto et al. "Photocatalytic degradation of methyl tert-butyl ether in TiO$_2$ slurries: a proposed reaction scheme," Water Res. 29:1243-1248 (1995)).

A more commonly used method of treating aqueous solutions for disinfection of microorganisms is chemically treating the solution with chlorine. Disinfection with chlorine, however, has several disadvantages. For example, chlorine content must be regularly monitored, formation of undesirable carcinogenic by-products may occur, chlorine has an unpleasant odor and taste, and chlorine requires the storage of water in a holding tank for a specific time period.

Aqueous solutions used for hydraulically fracturing gas wells (e.g., fracturing or frac fluids) or otherwise stimulating petroleum, oil and/or gas production also require treatment. Such solutions or frac fluids typically include one or more components or contaminants including, by way of example and without limitation, water, sand, diluted acid (e.g., hydrochloric acid), one or more polymers or friction reducers (e.g., polyacrylamide), one or more antimicrobial agents (e.g. glutaraldehyde, ethanol, and/or methanol), one or more scale inhibitors (e.g. ethylene glycol, alcohol, and sodium hydroxide), and one or more thickening agents (e.g., guar). In addition, a significant percentage of such solutions and fluids return toward the Earth surface as flowback, and later as produced water, after they have been injected into a hydrofrac zone underground. As they return toward the Earth surface, the solutions and fluids also pick up other contaminants from the earth such as salt (e.g., sodium and calcium salts). Such fluids may also include barium, oil, strontium, iron, heavy metals, soap, high concentrations of bacteria including acid producing and sulfate reducing bacteria, etc.

Aqueous solutions used for hydraulically fracturing gas wells or otherwise stimulating oil and gas production are difficult and expensive to treat for many reasons including, without limitation, the salinity of the solutions. For that reason, such fluids are often ultimately disposed of underground, offsite, or into natural water bodies. In some cases, certain states and countries will not allow fracking due to remediation concerns.

Accordingly, there is a need in the art for alternative approaches for treating aqueous solutions to remove and/or reduce amounts of contaminants. Specifically, it would be advantageous to have apparatus and/or methods for treating various aqueous solutions including hydraulic fracturing fluid, hydraulic fracturing backflow water, high-salinity water, groundwater, seawater, wastewater, drinking water, aquarium water, and aquaculture water, and/or for preparation of ultrapure water for laboratory use and remediation of textile industry dye waste water, among others, that help remove or eliminate contaminants without the addition of chemical constituents, the production of potentially hazardous by-products, or the need for long-term storage.

SUMMARY

The present disclosure is generally directed to devices and methods of treating aqueous solutions to help remove or otherwise reduce levels or amounts of one or more contaminants. More specifically, the present disclosure relates to an apparatus for removing or reducing the level of contaminants in a solution comprising a housing having first opposing end and a second opposing end and at least partially defining a cavity having a cavity wall and a cavity length; a light tube provided within the cavity and adapted to help disburse or otherwise provide ultraviolet radiation over most of the cavity length; a photoelectrode provided around the light tube; a counterelectrode provided in the space between the photoelectrode and the cavity wall, and a separator provided between the photoelectrode and counterelectrode; wherein the photoelectrode comprises a primarily titanium foil support with a layer of titanium dioxide provided on at least one surface the photoelectrode; and wherein the photoelectrode and counterelectrode are each coupled to a respective terminal adapted to be electrically coupled to a power supply.

The present invention further relates to a method for removing or reducing the level of contaminants in a solution comprising providing a solution into a cavity of a device, wherein the cavity of the device houses a light tube, a photoelectrode comprising a primarily titanium foil support with a layer of titanium dioxide provided thereon provided around the light tube, and a counterelectrode provided in the space between the photoelectrode and a cavity wall of the device; irradiating the photoelectrode with ultraviolet light; and applying a first bias to a first terminal coupled to the photoelectrode and a second terminal coupled to a counterelectrode.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein:

FIG. 5 is a partial isometric view of a device or apparatus, according to one or more examples of embodiments.

FIG. 6 is an exploded view of an electrical or terminal configuration of the device or apparatus illustrated in FIG. 5, according to one or more examples of embodiments.

FIG. 8 is a side view of the device or apparatus illustrated in FIG. 7, according to one or more examples of embodiments.

FIG. 9 is a top view of the device or apparatus illustrated in FIG. 7 according to one or more examples of embodiments.

FIG. 10 is an end view of the device or apparatus illustrated in FIG. 7, according to one or more examples of embodiments.

FIG. 15 is an isometric view of a spacer, according to one or more examples of embodiments.

FIG. 16 is an exit end view of the spacer illustrated in FIG. 15, according to one or more examples of embodiments.

FIG. 17 is an entrance end view of the spacer illustrated in FIG. 15, according to one or more examples of embodiments.

FIG. 18 is a cross-sectional view of the spacer illustrated in FIG. 15, according to one or more examples of embodiments.

Figure 1:
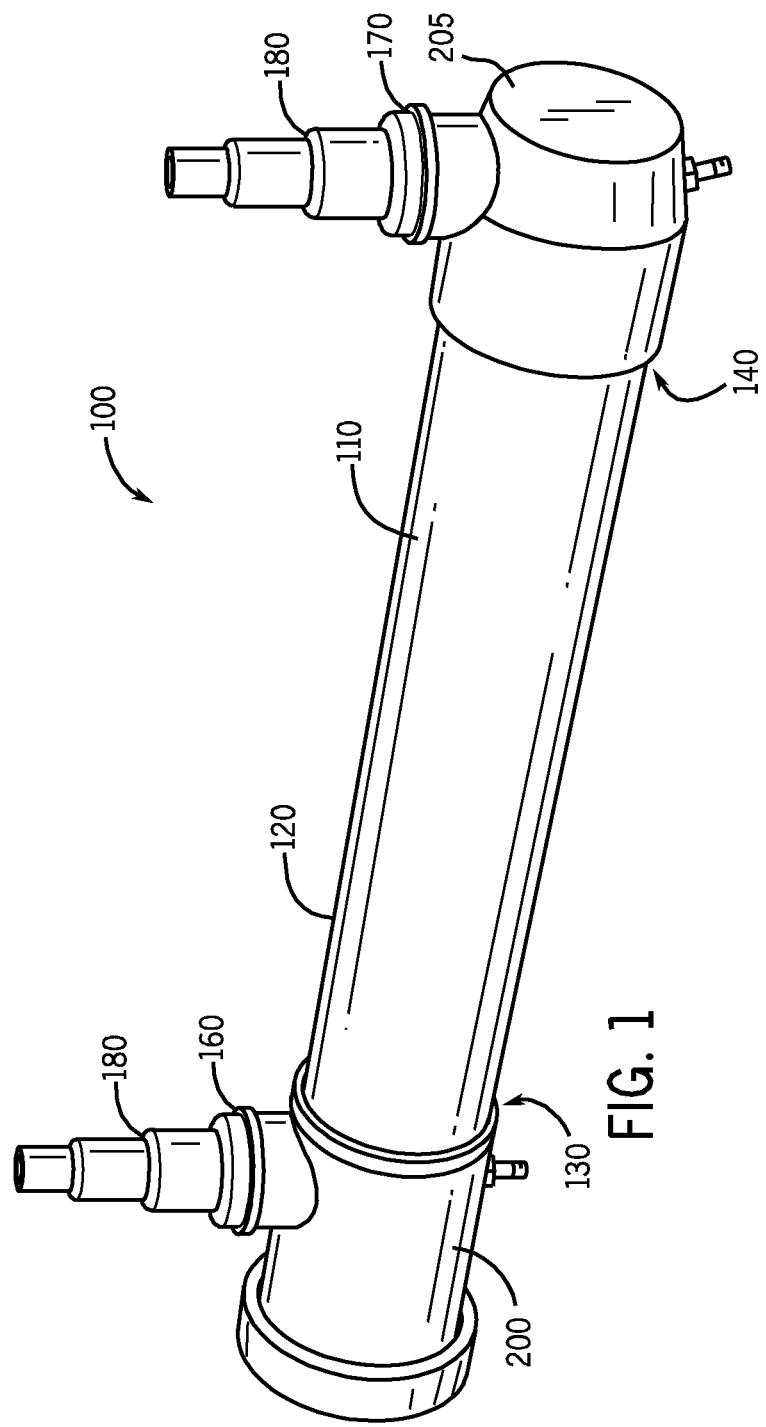
FIG. 1 is an isometric view of a device or apparatus, according to one or more examples of embodiments.

While the disclosure is susceptible to various modifications and alternative forms, specific embodiments thereof have been shown by way of example in the drawings and are herein described below in detail. For example, any numbers, measurements, and/or dimensions illustrated in the Figures are for purposes of example only. Any number, measurement or dimension suitable for the purposes provided herein may be acceptable. It should be understood that the description of specific embodiments is not intended to limit the disclosure from covering all modifications, equivalents and alternatives falling within the spirit and scope of the disclosure.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein may be used in the practice or testing of the present disclosure, example methods and materials are described below.

Various embodiments of system, apparatus, and device (e.g., a photoelectric catalytic oxidation (PECO) system, apparatus, and device) are described. In various embodiments, the device includes and/or is provided in an apparatus or reactor or substantially self-contained device. The device or reactor in various embodiments includes a housing or container which is adapted to receive components (e.g. operative components) of the device and/or receive, contain and/or circulate fluid or aqueous solution. In various embodiments, the container houses at least one counterelectrode (e.g. cathode) and at least one photoelectrode (e.g. anode) provided or arranged around at least one UV light source. In various embodiments, a counterelectrode (e.g. cathode), a photoelectrode (e.g. anode), and a UV light source may be provided in a structure, such as a tubular or annular housing or container. In various embodiments, flow of fluid or solution is facilitated past the photoelectrode and counterelectrode. In various embodiments, one or more power supplies and/or ballasts are included or provided for powering the UV-light source and/or for providing electrical potential to one or more of the counterelectrodes (e.g., cathodes) and photoelectrodes (e.g., anodes). In various embodiments, one or more power supplies and/or ballasts are electrically coupled to UV-light sources and/or electrodes, but provided externally to the container, housing or device.

Generally, in various embodiments, a method for reducing the level or amount of one or more contaminants in solution or fluid described includes introducing the solution into a housing or container or cell including: a UV light; a photoelectrode (e.g., anode), wherein the photoelectrode comprises an anatase polymorph of titanium, a rutile polymorph of titanium, or a nanoporous film of titanium dioxide; and a counterelectrode (e.g., cathode). In various embodiments, the photoelectrode is irradiated with UV light, and a first potential or bias is applied to the photoelectrode and counterelectrode for a first period of time. In various embodiments, a second potential or bias is applied to the photoelectrode and counterelectrode for a second period of time. As a result, in various embodiments, a contaminant level or amount in solution is reduced.

Figure 2:
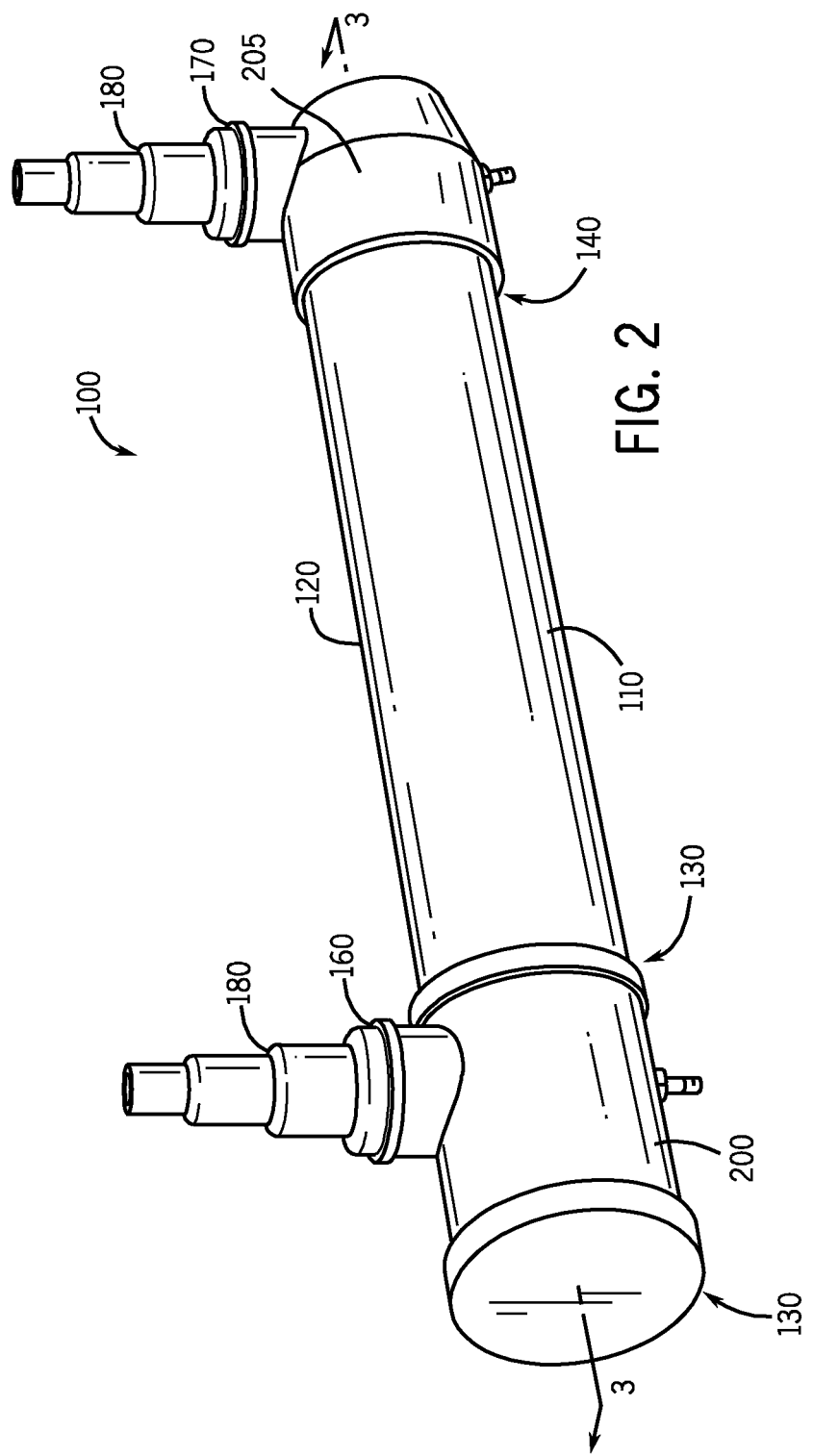
FIG. 2 is an isometric view of the device or apparatus illustrated in FIG. 1, according to one or more examples of embodiments.
Figure 3:
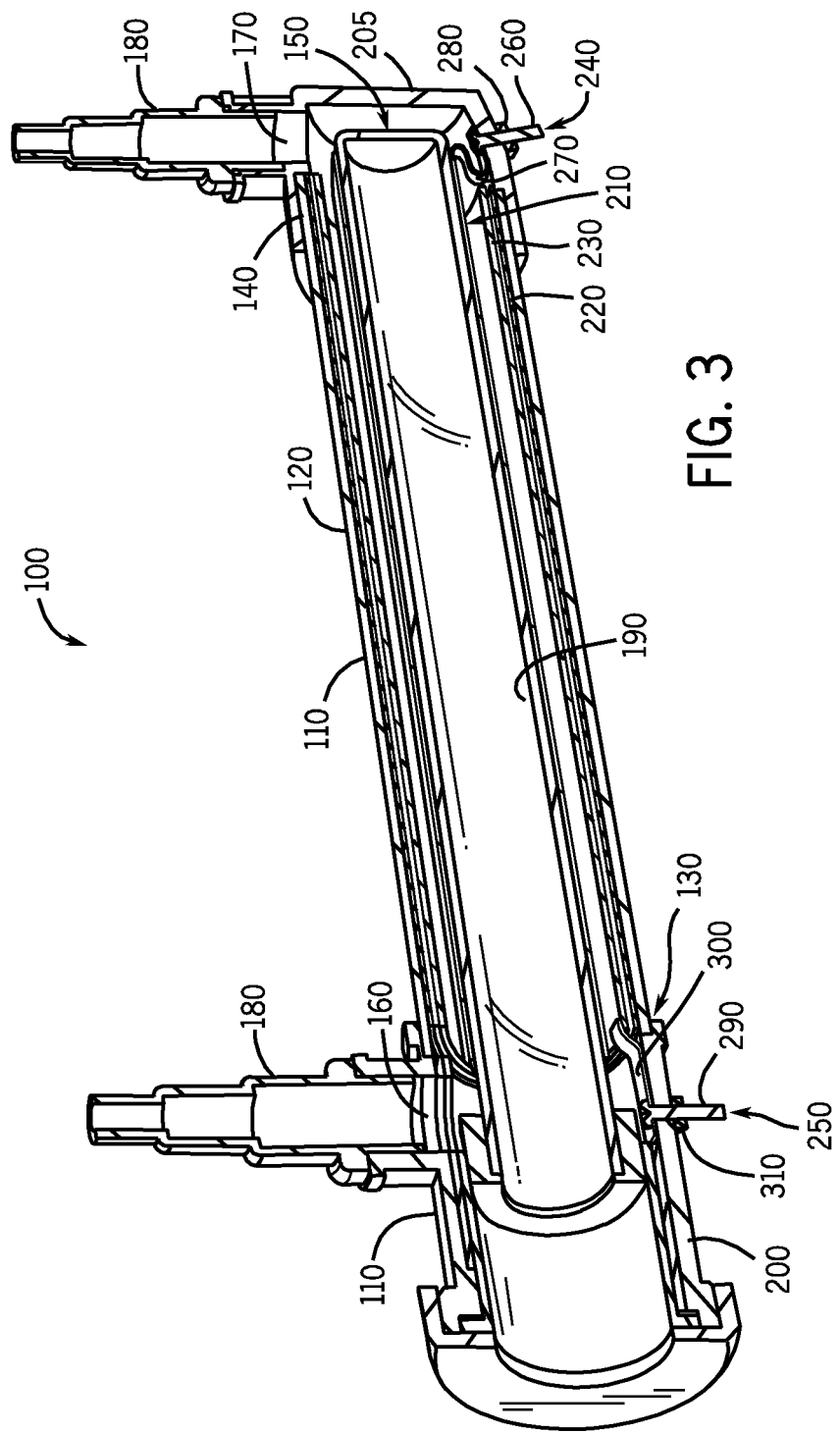
FIG. 3 is an isometric cross-sectional view of a device or apparatus, according to one or more examples of embodiments.

An example of a device or apparatus (e.g., photoelectrocatalytic oxidation (PECO) device or apparatus) 100 according to one or more examples of embodiments is shown in FIGS. 1-3. In various embodiments, device 100 includes a housing 110. The housing may be formed of any suitable material and of any size or shape suitable for its intended purposes. In one or more examples of embodiments, housing 110 is a molded, high-durability plastic or polyethylene and/or may be formed to be resistant to one or more contaminants. In various embodiments, housing 100 includes at least one generally annular, tubular (e.g., a square or rectangular tube), cylindrical or conical wall or sidewall 120 (e.g., tubular or cylindrical wall) extending between a first opposing end 130 and a second opposing end 140. In various embodiments, housing 110 includes a first end assembly member 200 provided about first opposing end 130 and a second end assembly member provided about second opposing end 140. In various embodiments, one or both end assembly members 200/205 define a cavity or other feature shaped to fit snugly or tightly to or otherwise receive one or both opposing ends 130/140. However, one or both end assembly members 200/205 may be coupled with or to opposing ends 130/140 and/or walls or sidewalls 120 in other ways (e.g., through a threaded connection or by butting the end assembly members to or near first and second opposing ends). In various embodiments, a seal (e.g., an o-ring) is provided between one or both end assembly members 200/205 and opposing ends 130/140 and/or walls or sidewalls 120. Alternative materials and shapes suitable for the purposes of the device are also acceptable.

In various embodiments, one or more inlets or in-flow apertures 160 and/or outlets or out-flow apertures 170 are defined by housing 110, end assembly members 200/205, and/or sidewalls 120. In various embodiments, the in-flow and out-flow apertures 160/170 are generally defined by end assembly members 200/205 and provided near or about opposing ends 130/140 of housing 110. However, the locations of the in-flow and out-flow apertures may vary depending upon the desired results (e.g., the flow of solution through the device, the timing and/or length of time thereof, other device configurations, etc.). For example, in-flow and out-flow apertures may be provided through one or more walls or sidewalls, or ends of the device. In addition, the orientation of the in-flow and out-flow apertures (e.g., relative to each other) may be different than that shown in the figures. For example, the in-flow and out-flow apertures may not be parallel relative to each other.

As shown in FIGS. 1-3, one or more fittings or couplings 180 may be coupled or attached to, or integral to, one or more inlets 160 or outlets 170 defined by housing 110 (e.g., for coupling, connecting or mating housing 110 or device 100 with a supply or inlet line or hose, discharge or outlet line or hose, recirculation line or hose, or other line or hose). In one or more examples of embodiments, the fluid supply source line or hose and/or the waste-line or out-flow may be a tube or pipe or other commercially available device used for transporting a fluid. In various embodiments, fitting or coupling 180 is tapered to improve fitment with a line, pipe or hose. However, various coupling configurations (including, without limitation, screw or quick connect configurations) may be utilized. Further, the fittings or couplings may be formed of any suitable material and of any size or shape suitable for their intended purposes.

At least one pump (not shown) may optionally be provided internally (i.e., within the housing) or externally to the housing to help facilitate transfer or movement of fluid or solution through the device or a system of devices. The pump may also be used, for example, for circulation or recirculation.

Referring to FIG. 3, in various embodiments, one or more walls or sidewalls 120 of housing 110 help define at least one cavity 150 having a cavity wall. In various embodiments, end assembly members 200/205 help further define cavity 150. In various embodiments, cavity 150 is substantially or entirely annular, tubular, cylindrical, or conical in shape. In various embodiments, cavity 150 is adapted to receive various components of the device. In various embodiments, the inlets or in-flow apertures 160 and outlets or out-flow apertures 170 pass through housing 110 from cavity 150. In various embodiments, apart from the inlets or in-flow apertures 160 and outlets or out-flow apertures 170, cavity 150 is sealed or substantially sealed (e.g., from the outside environment and/ or an environment exterior to housing 110) to prevent various elements (e.g., air or oxygen) from entering cavity 150 and/or various elements (e.g., a solution) from exiting or escaping cavity 150, except through in-flow and/or outflow apertures 160/170. It should also be noted that, in various embodiments, flow through cavity 150 may be reversed such that solution enters cavity 150 through out-flow aperture(s) 170 and exits cavity 150 through in-flow aperture(s) 160.

In various embodiments, device 100 includes at least one light tube or sleeve 190. In various embodiments, light tube or sleeve 190 is provided within (e.g., within cavity 150) and spaced from wall(s) 120 of housing 110. In various embodiments, light tube or sleeve 190 is concentric within and spaced from the wall(s) (e.g., cylindrical walls) 120 of housing 110. The light tube or sleeve may be provided (e.g., removably coupled) within the housing in a variety of manners and by employing a variety of means. For example, in various embodiments, as shown in FIG. 4, light tube or sleeve 190 is coupled to an end cap 215, and provided or inserted into cavity 150, and end cap 215 is at least partially coupled or releasably coupled to and/or near opposing end 130 (e.g., in a cavity defined by first assembly member 200).

Figure 4:
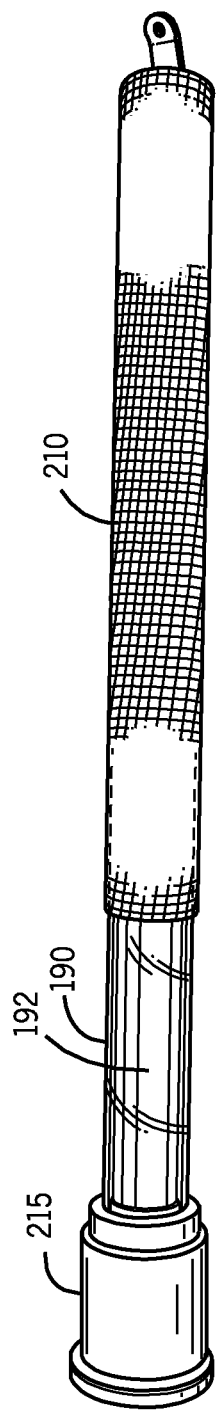
FIG. 4 is an isometric view of a photoelectrode provided around (e.g., partially around for purposes of illustration) a light tube or sleeve provided in an end cap, according to one or more examples of embodiments.
Figure 7:
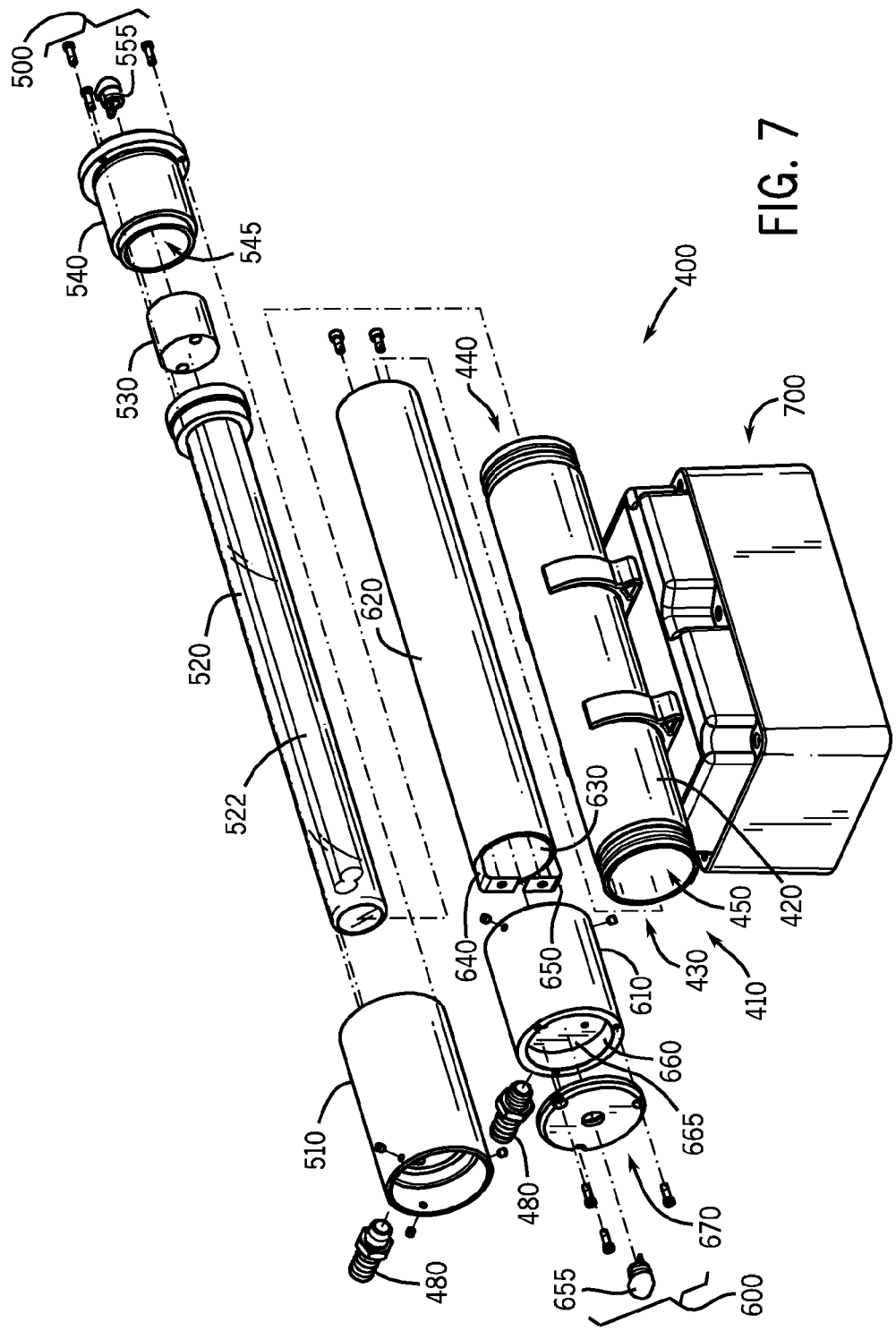
FIG. 7 is an exploded isometric view of a device or apparatus, according to one or more examples of embodiments.
Figure 11:
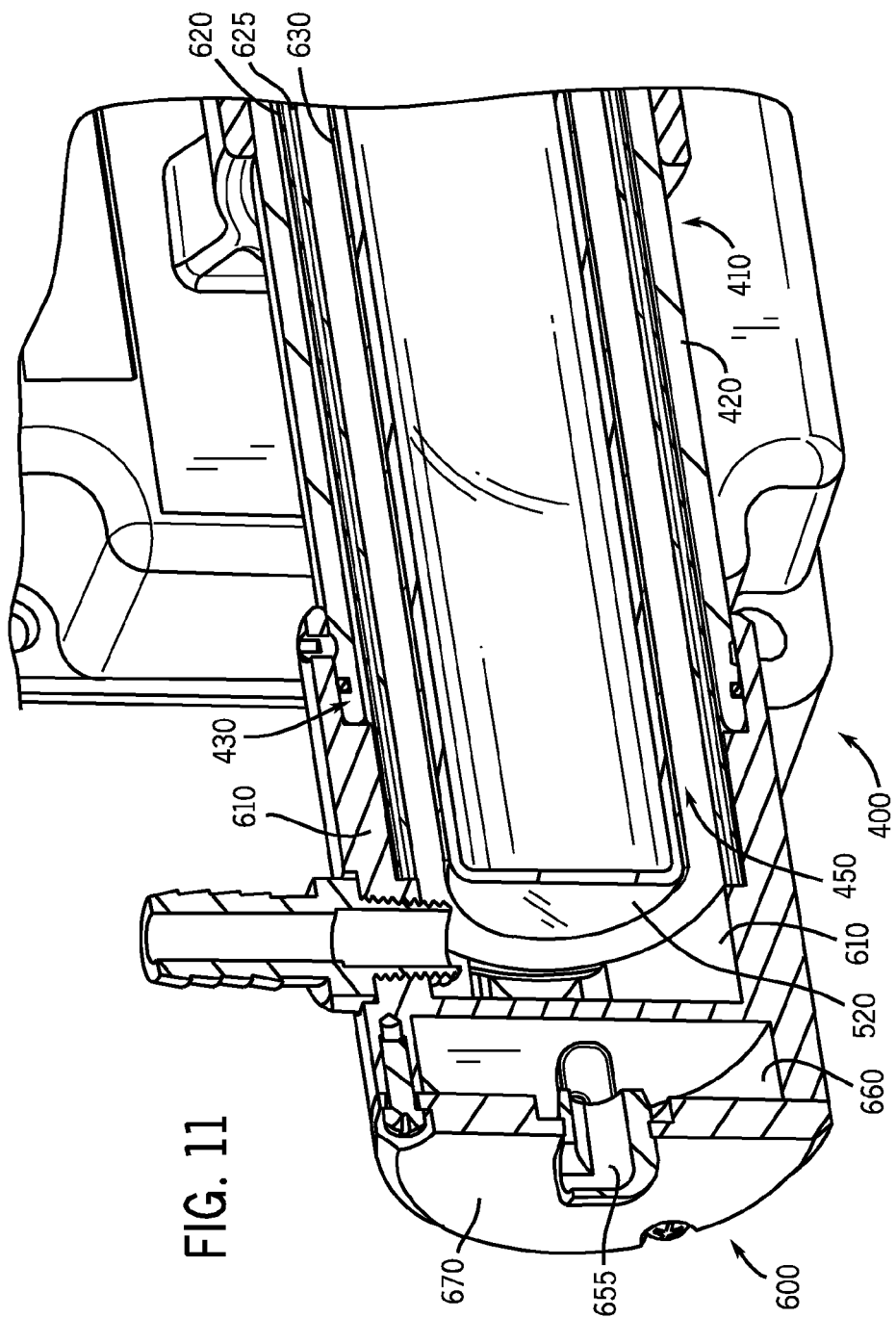
FIG. 11 is a partial cross-sectional isometric view of a device or apparatus, according to one or more examples of embodiments.
Figure 12:
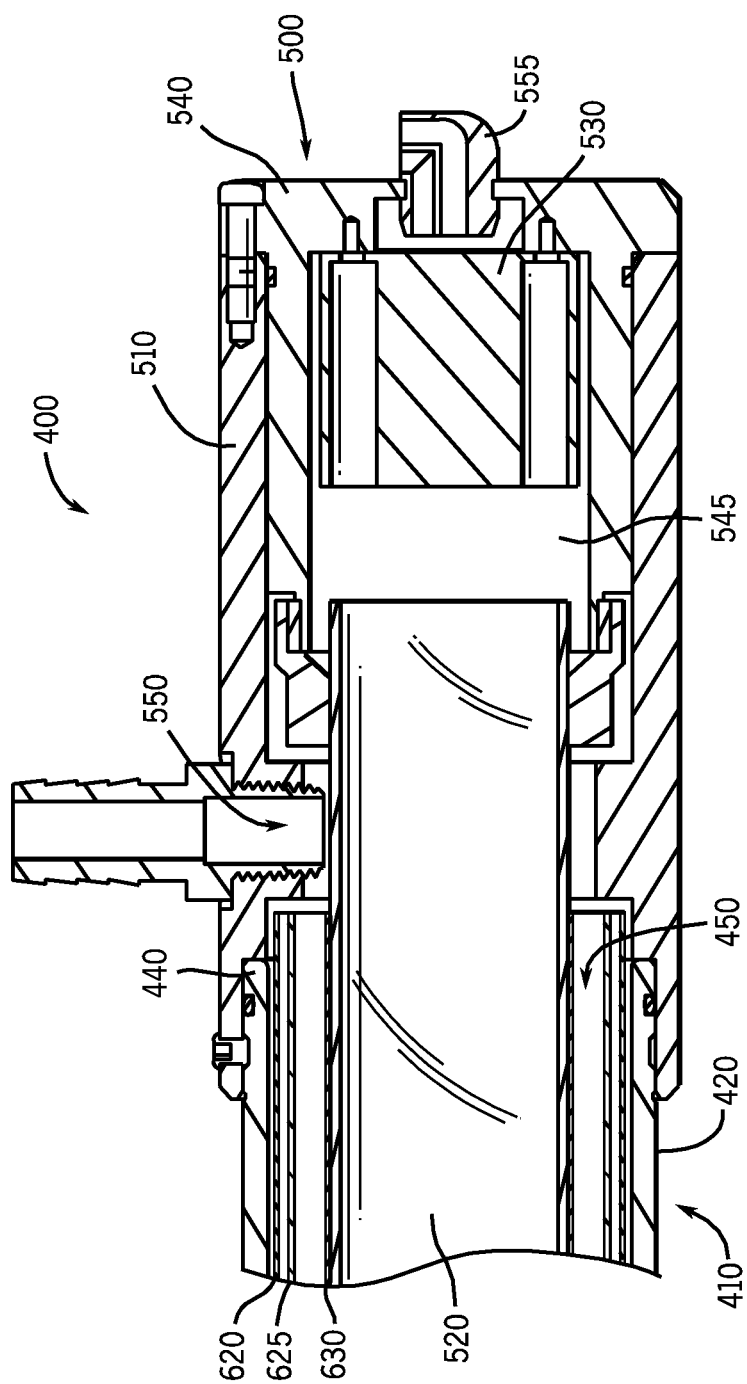
FIG. 12 is a partial cross-sectional isometric view of a device or apparatus, according to one or more examples of embodiments.
Figure 13:
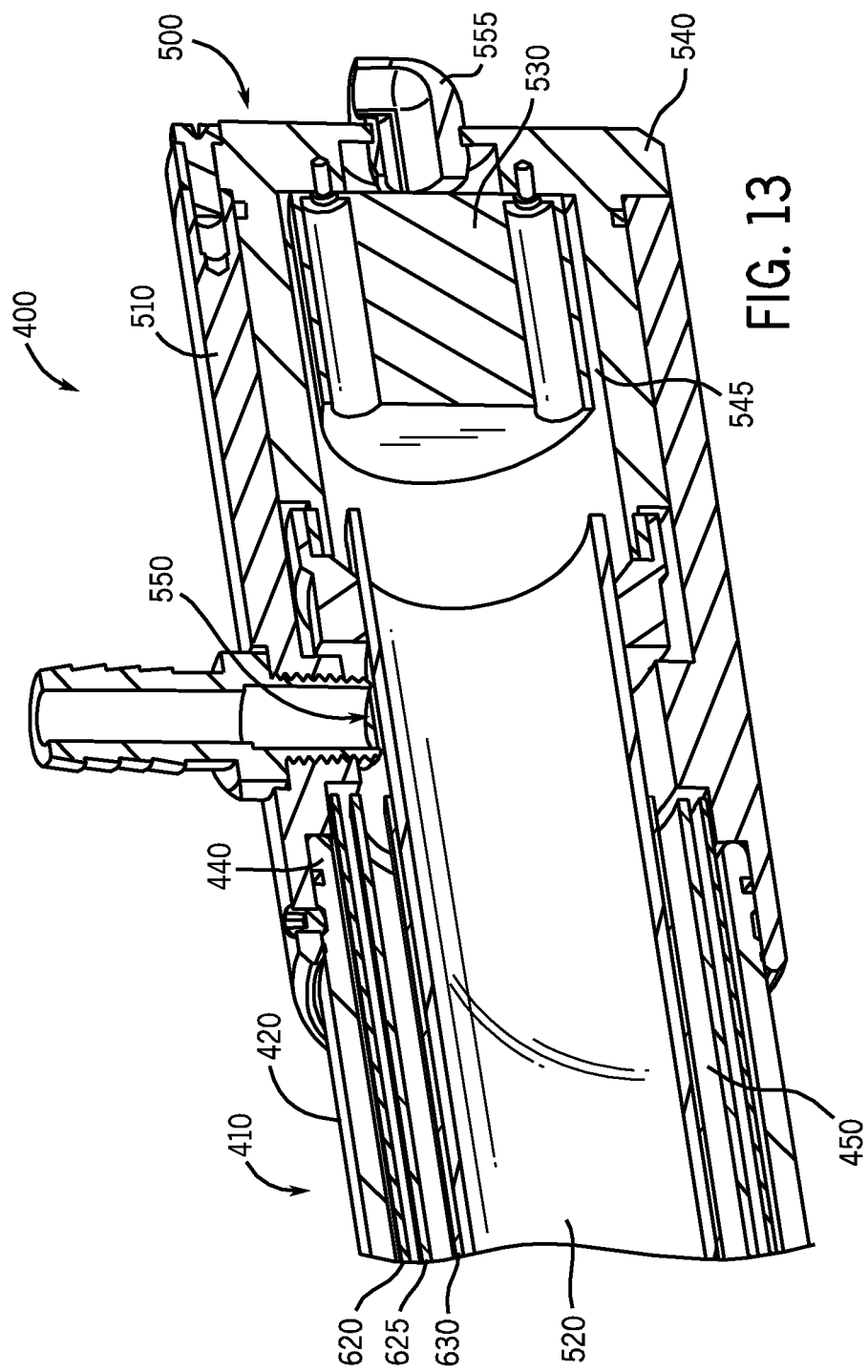
FIG. 13 is a partial cross-sectional view of the device or apparatus illustrated in FIG. 12, according to one or more examples of embodiments.

Referring to FIGS. 3-4, in various embodiments, light tube or sleeve 190 is adapted to disburse, distribute or otherwise transport or provide light over some, most, or all of the length of light tube or sleeve 190 and/or some, most, or all of a length of cavity 150.

In one or more examples of embodiments, light tube or sleeve 190 is formed of any material suitable for the purposes provided. In one or more examples of embodiments, light tube or sleeve 190 is made of quartz. However, the sleeve may be UV-transparent material, such as, but not limited to, plastic or glass, or combinations of materials including such UV-transparent and/or UV-translucent material. Alternatively, the UV light source may be used without a light tube or sleeve.

In various embodiments, light tube or sleeve 190 has at least one wall or sidewall that includes a surface and defines a cavity that at least partially houses and/or is at least partially adapted to receive one or more light sources and/or light source assemblies 192 (e.g., an ultraviolet (UV) light source, light, or lamp). For example, a UV-light bulb or bulbs may be provided or inserted into the cavity of the light tube or sleeve. In various embodiments, a UV source and/or light tube or sleeve 190 is provided and/or extends a distance into cavity 150 of device 100, such that the UV is exposed to a photoelectrode 210 (and/or a photoelectrode 210 is exposed to UV), illuminating or radiating to some or all of a surface thereof according to the embodiments described herein.

According to various embodiments, a light source such as a UV bulb is provided or inserted into a socket provided in end cap 215 and may be secured in position. The UV bulb is further coupled or connected (e.g., via the socket), or adapted to be coupled or connected, to a source of power. In various embodiments, the UV bulb is coupled or connected via one or more cables or wires to one or more ballasts and/or power sources. In various embodiments, the UV bulb is inserted or otherwise provided in first opposing end 130 of housing 110 and the bulb extends into at least a majority of light tube or sleeve 190. However, in various embodiments, the UV bulb may extend only partially or not at all into light tube or sleeve 190.

In various embodiments, the UV light source is a high irradiance UV light bulb. In one or more further examples of embodiments, the UV bulb is a germicidal UV bulb with a light emission in the range of 400 nanometers or less, and more preferably ranging from 250 nanometers to 400 nanometers.

In various embodiments, the ultraviolet light of the UV light source has a wavelength in the range of from about 185 to 380 nm. In one or more examples of embodiments, the light or lamp is a low pressure mercury vapor lamp adapted to emit UV germicidal irradiation at 254 nm wavelength. In one or more alternative examples of embodiments, a UV bulb with a wavelength of 185 nm may be effectively used. Various UV light sources, such as those with germicidal UVC wavelengths (peak at 254 nm) and black-light UVA wavelengths (UVA range of 300-400 nm), may also be utilized. In one or more examples of embodiments, an optimal light wavelength (e.g. for promoting oxidation) is 305 nm. However, various near-UV wavelengths are also effective. Both types of lamps may emit radiation at wavelengths that activate photoelectrocatalysis. The germicidal UV and black light lamps are widely available and may be used in commercial applications of the instant PECO device.

In one or more additional examples of embodiments, the UV light source or lamp is adapted to emit an irradiation intensity in the range of 1-500 mW/cm$^2$. The irradiation intensity may vary considerably depending on the type of lamp used. Higher intensities may improve the performance of the device (e.g., PECO device). However, the intensity may be so high that the system is UV-saturated or swamped and little or no further benefit is obtained. That optimum irradiation value or intensity may depend, at least in part, upon the distance between the lamp and one or more photoelectrodes.

The intensity (i.e., irradiance) of UV light at the photoelectrode may be measured using a photometer available from International Light Technologies Inc. (Peabody, Mass.), e.g., Model IL 1400A, equipped with a suitable probe. An example irradiation is greater than 3 mW/cm$^2$.

UV lamps typically have a "burn-in" period. UV lamps may also have a limited life (e.g., in the range of approximately 6,000 to 10,000 hours). UV lamps also typically lose irradiance (e.g., 10 to 40% of their initial lamp irradiance) over the lifetime of the lamp. Thus, it may be important to consider the effectiveness of new and old UV lamps in designing and maintaining oxidation values.

In one or more examples of embodiments, the light source assembly is disposed exterior to the housing, and the housing includes a transparent or translucent member adapted to permit ultraviolet light emitted from the light source assembly to irradiate the photoelectrode. The device may also function using sunlight instead of, or in addition to, the light source assembly.

In one or more examples of embodiments, and as shown in FIGS. 3 and 4, photoelectrode 210 includes opposing surfaces. In various embodiments, photoelectrode 210 is wrapped, wound, or otherwise provided around the surface of light tube or sleeve 190. In various embodiments, photoelectrode 210 is provided (e.g., around light tube or sleeve 190) to optimize the distance, separation or spacing between photoelectrode 210 and light source 192 (e.g., UV light) and/or tube or sleeve 190. In various embodiments, photoelectrode 210 is provided closely or tightly around or against the surface of light tube or sleeve 190. In various embodiments, photoelectrode 210 is coupled (e.g., removably coupled) to light tube or sleeve 190.

FIG. 4 shows photoelectrode 210 only partially covering sleeve 190 for illustrative purposes. In one or more examples of embodiments, photoelectrode 210 (e.g., a foil photoelectrode) is wrapped, wound or otherwise provided around light tube or sleeve 190 such that a majority of the UV light or radiation (e.g., from the UV source within light tube or sleeve 190) is directed at or otherwise exposed to photoelectrode 210. In various embodiments, photoelectrode 210 is wrapped, wound, or otherwise provided around light tube or sleeve 190, such that a substantial portion of the UV light or radiation is exposed to and/or directed at photoelectrode 210. In various embodiments, photoelectrode 210 is provided relatively close to light tube or sleeve 190 such that less than half (e.g., a relatively small percentage) of any volume of solution in or flowing through housing 110 of reactor or device 100 is exposed to light directly from the UV light or UV source.

In various embodiments, photoelectrode 210 is provided relative to light tube or sleeve 190 such that most of the volume of cavity 150 of reactor or device 100 is between photoelectrode 210 and wall or sidewall 120. In various embodiments, photoelectrode 210 is provided relative to light tube or sleeve 190 such that most of the average cross-sectional area of cavity 150 of reactor or device 100 is between photoelectrode 210 and wall or sidewall 120. In various embodiments, photoelectrode 210 is provided relative to light tube or sleeve 190 such that the average cross-sectional area between photoelectrode 210 and wall or sidewall 120 is greater than the average cross-sectional area between photoelectrode 210 and light tube or sleeve 190.

In various embodiments, the surface of light tube or sleeve 190 nearest photoelectrode 210 and the surface of photoelectrode 210 nearest light tube or sleeve 190 help define a first cross-sectional area and the opposing surface of photoelectrode 210 and a surface of the cavity wall define a second cross-sectional area, and wherein the first cross-sectional area is smaller than the second cross-sectional area. In various embodiments, the distance from the surface of photoelectrode 210 nearest light tube or sleeve 190 to the surface of light tube or sleeve 190 nearest photoelectrode 210 is less than the distance from the opposing surface of photoelectrode 210 to the surface of the cavity wall nearest photoelectrode 210.

In various embodiments, photoelectrode 210 is provided around light tube or sleeve 190 such that it is closer to light tube or sleeve 190 than to sidewall 120 (e.g., to help promote or facilitate flow of most of solution in space between photoelectrode 210 and sidewalls 120. In various embodiments, the average distance or spacing between a surface of photoelectrode 210 nearest light tube or sleeve 190 and a surface of light tube or sleeve 190 nearest photoelectrode 210 is less than one-half inch. In various embodiments, the average distance or spacing between photoelectrode 210 and light tube or sleeve 190 is less than three-eighths of an inch.

In various embodiments, however, the photoelectrode is provided relatively farther from the light tube or sleeve such that half or more of any volume of solution in or flowing through the housing of the reactor or device is exposed to light directly from the UV light or UV source.

In various embodiments, the photoelectrode is provided relative to light tube or sleeve 190 such that about half or less of the volume of the cavity of the reactor or device is between the photoelectrode and the wall or sidewall. In various embodiments, the photoelectrode is provided relative to the light tube or sleeve such that about half or less of the average cross-sectional area of the cavity of the reactor or device is between the photoelectrode and the wall or sidewall. In various embodiments, the photoelectrode is provided relative to the light tube or sleeve such that the average cross-sectional area between the photoelectrode and the wall or sidewall is about equal or less than the average cross-sectional area between the photoelectrode and the light tube or sleeve.

In various embodiments, the surface of the light tube or sleeve nearest the photoelectrode and the surface of the photoelectrode nearest the light tube or sleeve help define a first cross-sectional area and the opposing surface of the photoelectrode and a surface of the cavity wall define a second cross-sectional area, and wherein the first cross-sectional area is equal or larger than the second cross-sectional area. In various embodiments, the distance from the surface of the photoelectrode nearest the light tube or sleeve to the surface of the light tube or sleeve nearest the photoelectrode is about equal or more than the distance from the opposing surface of the photoelectrode to the surface of the cavity wall nearest the photoelectrode.

In various embodiments, photoelectrode 210 includes a conductive support member and a film member. In one or more examples of embodiments, the conductive support member is constructed from metal (e.g. titanium or Ti). In various embodiments, the film member is nanoporous and includes a thin layer (e.g., 200-500 nm) of titanium dioxide ($TiO_2$) (e.g., a $TiO_2$ coating) that is provided and/or adapted to function as a photocatalyst. In various examples of embodiments, the film member has an average thickness in the range of 1-2000 nanometers. In one or more examples of embodiments, the film member has an average thickness in the range of 5 to 500 nanometers.

In various embodiments, the film member is provided on (e.g., coated on or adhered to) the conductive support member. In various embodiments, the film member has a median pore diameter in the range of 0.1-500 nanometers and is constructed from $TiO_2$ nanoparticles. In one or more examples of embodiments, the median pore diameter of the film member is in the range of 0.3-25 nanometers. In other examples of embodiments, the median pore diameter of the film member is in the range of 0.3-10 nanometers.

In various examples of embodiments, the film member is constructed from a stable, dispersed suspension comprising $TiO_2$ nanoparticles having a median primary particle diameter in the range of 1-50 nanometers. The nanoporous film may also be deposited by other methods, such as plasma, chemical vapor deposition or electrochemical oxidation. In one or more examples of embodiments, the $TiO_2$ nanoparticles have a median primary particle diameter in the range of 0.3-5 nanometers.

In various embodiments, the film member is constructed from a stable, dispersed suspension including a doping agent. Examples of suitable doping agents include, but are not limited to, Pt, Ni, Au, V, Sc, Y, Nb, Ta, Fe, Mn, Co, Ru, Rh, P, N and/or carbon.

In various examples of embodiments, the nanoporous film member is constructed by applying a stable, dispersed suspension having $TiO_2$ nanoparticles suspended therein. In various embodiments, the $TiO_2$ nanoparticles are sintered at a temperature in the range of 300 deg C. to 1000 deg C. for 0.5 to 24 hours. Example photoelectrodes may be prepared by coating Ti metal foil. Titanium foil is stable and may also be used to make photoelectrodes. One example of suitable Ti metal foil includes 15 cm×15 cm×0.050 mm thickness and 99.6+% (by weight) pure Ti metal foil commercially available from Goodfellow Corp. (Oakdale, Pa.) with a titania-based metal oxide. In various embodiments, the Ti metal foil is cleaned with a detergent solution, rinsed with deionized water, rinsed with acetone, and/or heat-treated at 350 deg C. for 4 hours providing an annealed Ti foil. Annealing may also be conducted at higher temperatures such as 500 deg C.

Following cleaning and/or pretreatment, in various embodiments, the metal foil may be dip-coated. For example, the metal foil may be dip-coated three to five times with an aqueous suspension of titania at a withdrawal rate of ~3.0 mm/sec. After each application of coating, in various embodiments, the coated foil is air dried for about 10-15 min and then heated in an oven at 70 deg C. to 100 deg C. for about 45 min. After applying a final coating, in various embodiments, the coated foil is sintered at 300-600 deg C. (e.g., 300 deg C., 400 deg C. or 500 deg C.) for 4 hours at a 3 deg C./min ramp rate. The Ti foil may be dipped into suspensions of titania synthesized using methods disclosed in U.S. patent application Ser. Nos. 11/932,741 and 11/932,519, each of which is incorporated herein by reference in its entirety. In various embodiments, the optimized withdrawal speed is around 21.5 cm min$^{-1}$.

In addition, in one or more examples of embodiments of the photoelectrode, the stable, dispersed suspension is made by reacting titanium isopropoxide and nitric acid in the presence of ultrapure water or water purified by reverse osmosis, ion exchange, and one or more carbon columns. In various embodiments, the conductive support member is annealed titanium foil. Other conductive supports may be employed, such as conductive carbon or glass. In various other embodiments, the photoelectrode is constructed from an anatase polymorph of Ti or a rutile polymorph of Ti. In one or more examples of embodiments of the photoelectrode, the rutile polymorph of Ti is constructed by heating an anatase polymorph of Ti at a temperature in the range of 300 deg C. to 1000 deg C. for a sufficient time. In one or more examples of embodiments of the photoelectrode, the anatase polymorph of Ti is heated at 500 deg C. to 600 deg C. to produce the rutile polymorph of Ti.

In various embodiments, after the titanium support is provided with a layer or film of TiO$_2$, the composite electrode is air-heated at a high temperature, giving the nanoporous TiO$_2$ film a crystalline structure due to thermal oxidation. It is believed that the instant titania, when heated at 500 deg C., converts to a crystalline rutile polymorph structure. It is further believed that the instant TiO$_2$ heated at 300 deg C. converts to a crystalline anatase polymorph structure. In some PECO applications, rutile TiO$_2$ has substantially higher catalytic activity than the anatase TiO$_2$. Rutile TiO$_2$ may also have substantially higher catalytic activity with respect to certain contaminant such as ammonia.

In various embodiments, photoelectrode 210 is modified (e.g., to improve performance). In various embodiments, photoelectrode 210 (e.g., Ti foil) is modified to increase the surface area of photoelectrode 210 exposed to light such as UV light. For example, photoelectrode 210 may be corrugated or otherwise modified as shown in FIGS. 3-4. As further examples, the photoelectrode may be wavy. The photoelectrode may include various other features or microfeatures to help optimize the surface exposed to UV light and/or help cause turbulence in fluid or solution about the photoelectrode.

In various embodiments, photoelectrode 210 modifications include corrugating or otherwise modifying photoelectrode 210, conductive support member or foil to produce a wave-like pattern (e.g., regular wave-like pattern) on the foil surface. In various embodiments, the height of a corrugation "wave" is from about 1-5 mm. For example, in various embodiments, corrugating the foil twice at right angles to each other produces a cross-hatched pattern on the foil surface.

In various embodiments, photoelectrode 210 modifications include holes or perforations made or provided in photoelectrode 210, conductive support member, or foil. In various embodiments, the holes or perforations are made or provided at regular intervals (e.g., 0.5 to 3 cm spacing between the holes).

Modifications of the photoelectrode may also include various microfeatures and/or microstructures. Accordingly to various embodiments, the modifications of the photoelectrode, conductive support member or foil may also include various microfeatures and/or microstructures that increase the relative surface area of the photoelectrode and/or increase or promote turbulence about the photoelectrode. For example, according to various embodiments, such microfeatures and/or microstructures include those that are disclosed in U.S. Patent Publication Nos. 20100319183 and 20110089604, each of which is incorporated herein by reference in its entirety, or such microfeatures and/or microstructures that are provided commercially from Hoowaki, LLC (Pendleton, S.C.). In various embodiments, the microfeatures may include microholes. In various embodiments, modifications of the photoelectrode include the formation of nanotubes (e.g., TiO$_2$ nanotubes) on the photoelectrode, conductive support member and/or foil such as, for example, those that are disclosed in U.S. Patent Publication No. 20100269894, which is incorporated herein by reference in its entirety.

As a result of the holes, the positioning, the corrugation, and other modifications, etc., the photoelectrode may help create turbulence in fluid flowing in and/or through the device. Additionally, one or more holes may allow oxidants generated or produced on or near a surface of photoelectrode 210 to more rapidly and effectively make their way into or otherwise reach or react with the fluid (e.g., aqueous solution) and/or contaminants therein.

In one or more examples of embodiments, the photoelectrode is in the form of a mesh (e.g., a woven mesh, such as a 40×40 twill weave mesh or 60×60 Dutch weave mesh, or a non-woven mesh). Multiple photoelectrodes may also be used to improve photocurrent and/or chlorine generation.

Referring again to FIG. 3, a counterelectrode (e.g., cathode) 220 is provided between wall 120 and/or the cavity wall of cavity 150 defined by the housing and photoelectrode (e.g., photoanode) 210. In various embodiments, counterelectrode or cathode material 220 is in the form of a foil. However, in various embodiments, the counterelectrode or cathode material may be in the form of a wire, plate, cylinder, or in another suitable shape or form. In various embodiments, the counterelectrode may be corrugated and/or have other features to help cause or promote turbulence in fluid or solution in the cavity.

In one or more examples of embodiments, counterelectrode or cathode 220 is constructed from or includes Al, Pt, Ti, Ni, Au, stainless steel, carbon and/or another conductive metal.

In various embodiments, photoelectrode 210 and counterelectrode 220 are separated by a separator 230. Separator 230 may be used or otherwise provided to prevent shorting. In one or more examples of embodiments, photoelectrode (e.g., anode) 210 and counterelectrode (e.g., cathode) 220 are separated by plastic or plastic mesh separator 230, although alternative separators (e.g., other dielectric material(s) or other separators accomplishing or tending to accomplish the same or similar purposes) may be acceptable for use with the device and system described herein. In the illustrated examples, and other example embodiments, counterelectrode (e.g., cathode) 220 is placed or otherwise provided "behind" the photoelectrode (e.g., anode) 210 relative to light tube or sleeve 190 or a light source (e.g., UV light source) (i.e., between housing 110 or sidewall 120 and photoelectrode 210).

Positioning of the photoelectrode and counterelectrode in relation to the relative surface area may be of importance in one or more examples of embodiments. For instance, a smaller surface area photoelectrode positioned relatively closer to UV light may generate more photocurrent and chlorine than a larger surface area photoelectrode positioned relatively farther from UV light. Centering of the photoelectrode or anode (e.g., within the cavity) may also be helpful in optimizing or maximizing productivity. Likewise, multiple photoelectrodes may be utilized to improve photocurrent, oxidation, and chlorine generation.

As shown in FIGS. 3, 5, and 6, a first terminal and/or terminal configuration 240 and a second terminal and/or terminal configuration 250 are electrically coupled to photoelectrode 210 and counterelectrode 220, respectively. The terminals 240/250 are adapted to receive an applied voltage bias, potential and/or current provided by a power source connected or otherwise coupled (e.g., electrically coupled) to terminals 240/250.

Example terminals 240/250, terminal connections, and terminal configurations are shown in FIGS. 3, 5, and 6. As shown, terminals 240/250 of respective photoelectrode 210 and counterelectrode 220 are provided about and/or near end assembly members 200/205 and/or opposing ends 130/140 of housing 110. However, in other embodiments, the terminals may be provided in relatively closer proximity to each other.

In various embodiments, terminals 240/250 are respectively electrically coupled (e.g., attached) to counterelectrode/cathode 220 and photoelectrode/anode 210 (e.g., to form a respective positive terminal and negative terminal). Terminals 240/250 are formed of a conductive material, such as a conductive metal. One or more of terminals 240/250 may define or be provided with an aperture for ease of connection or coupling of the terminal to a wire, electrical cable or the like.

As shown in FIGS. 3, 5 and 6, first terminal configuration 240 includes a first member (e.g., a Ti screw) 260 coupled to photoelectrode 210 and provided through housing 110 (e.g., end assembly member 205). In various embodiments, first member 260 may be provided through a second member 270 electrically coupled (e.g., welded) to photoelectrode 210, and removably secured to housing 110 with a first fastener 280 such as a hex nut. As shown in FIG. 3, second terminal configuration 250 includes a third member 290 (e.g., a Ti screw) electrically coupled to counterelectrode 220 and provided through housing 110. In various embodiments, third member 290 may be provided through or electrically coupled to a fourth member 300 electrically coupled to counterelectrode 220 and removably secured to housing 110 with a second fastener 310, such as a hex nut. In various embodiments, the first member is made of a metal or metals that is resistant to oxidants (e.g., chlorine, hydroxyl radicals, etc.) It should be appreciated, however, that any variety of terminal configurations may be used and any variety of materials and members may be utilized. For example, the first and/or second fastener may be a wing nut or made of another material, the first and/or second member may be a bolt, made of another conductive material, etc.

In various embodiments, and as shown in FIG. 6, first member 260 of first terminal configuration 240 is also provided through a washer 320 (e.g., titanium mesh washer) provided near housing 110. In various embodiments, first member 260 is also provided through a seal 330 (e.g., a rubber washer or gasket provided on an exterior of housing 110) to help prevent leaking of solution from the device or leaking of a component such as air into the device. However, the seal may be replaced or supplemented with any type of suitable seal or sealing material or compound. In various embodiments, the third member may also be provided through a washer and/or a seal.

A power supply may also be provided for supplying power to one or more UV lamps. The power supply, or an alternative power supply may also be provided for providing an applied voltage between the photoelectrode and counterelectrode. In one or more examples of embodiments, increasing the applied voltage increases photocurrent and/or chlorine production. In various embodiments, the applied voltage between the photoelectrode and the counterelectrode is provided to help ensure that electrons freed by photochemical reaction move or are moved away from the photoelectrode. The power supply may be an AC or DC power supply and may include a plurality of outputs. In one or more examples of embodiments, the power supply is a DC power supply. Preferably, the power supply is small in size, is durable or rugged, and provides power sufficient to operate one or more UV-lamps and/or to supply the applied voltage to the electrodes according to the previously described methods.

One or more power supplies, in one or more examples of embodiments, may be connected to a power switch for activating or deactivating the supply of power. In one or more further examples of embodiments, a power supply, UV lamps, and or electrodes, may be connected to or in communication with programmable logic controller or other control or computer for selectively distributing power to the UV lamps and/or to the electrodes, including anodes and cathodes described herein.

In various embodiments, one or more power supplies are external to the device. However, one or more power supplies may be internal to the device. The power supply(s), in one or more examples of embodiments, may be connected to a power switch for activating or deactivating the supply of power. In one or more further examples of embodiments, the power supply, UV lamps, and or electrodes, may be connected to or in communication with programmable logic controller or other control or computer for selectively distributing power to the UV lamps and/or to the electrodes, including anodes and cathodes described herein.

Referring now to FIGS. 7 through 13, a second exemplary embodiment of a device 400 (e.g., a PECO device) or apparatus is shown. In various embodiments, device 400 includes a housing 410. The housing may be formed of any suitable material and of any size or shape for any of its intended purposes. In various examples, housing 410 is a molded, high-durability plastic or polyethylene and/or may be formed to be resistant to one or more contaminants. In various embodiments, housing 410 has one or more sidewalls 420 extending between first and second opposing ends 430/440. In various embodiments, housing 410 is generally annular, tubular, cylindrical, or conical. In various embodiments, housing 410 and/or sidewalls 420 define a cavity 450 having a cavity wall. In various embodiments, housing 410 defines a generally annular, tubular, cylindrical, or conical cavity 450. Opposing ends 430/440 may be modified or adapted (e.g., threaded and/or grooved) to help couple or removably couple and/or seal other components or assemblies (such as bulb assembly or module 500 and/or electrode assembly or module 600) to housing 410.

In various embodiments, device 400 (e.g., PECO device or apparatus) includes a bulb assembly or module 500. In various embodiments, bulb assembly 500 includes a bulb assembly member 510, a light tube or sleeve 520, and a bulb socket 530. In various embodiments, bulb assembly 500 includes a bulb end cap 540, and a wiring guide or connector 555. In various embodiments, light tube or sleeve 520 defines a cavity adapted to receive a light source or lamp 522 (e.g., a UV light source). In various embodiments, bulb socket 530 is provided in a cavity 545 defined by bulb end cap 540 and/or coupled to the bulb end cap 540. In various embodiments, bulb end cap 540 is coupled (e.g., threaded onto) to light tube or sleeve 520. In various embodiments, bulb assembly member 510 defines a cavity. In various embodiments, the light tube or sleeve 520, bulb socket 530, and a portion of bulb end cap 540 are provided into and/or through the cavity of bulb assembly member 510, and bulb assembly member 510 is coupled to bulb end cap 540. In various embodiments, bulb assembly member 510 defines an inlet and/or an outlet 550. In various embodiments, a tubing or other adapter 480 is provided in the inlet/outlet defined by bulb assembly member 510. In various embodiments, a light source or lamp 522 (e.g., such as is described above) is provided in and/or coupled (e.g., electrically coupled) to bulb socket 530 and/or at least partially housed within light tube or sleeve 520. In various embodiments, bulb end cap 540 defines an aperture into which wiring guide or connector 555 and/or wiring electrically coupled to bulb socket 530 and/or a light source may be provided.

In various embodiments, device or apparatus 400 also includes an electrode assembly or module 600. In various embodiments, electrode assembly or module 600 includes a terminal assembly member 610, a counterelectrode 620 (e.g., such as is described above), provided around a photoelectrode 630 (e.g., such as is described above), with a separator 625 (e.g., such as is described above) provided therebetween, a first terminal 640 coupled to photoelectrode 630 and a second terminal 650 coupled to counterelectrode 620. In various embodiments, counterelectrode 620 is provided around and/or outside of photoelectrode 630. Each of the terminals 640/650 is coupled to and/or adapted to receive a voltage, potential or bias. In various embodiments, the terminals 640/650, and/or at least a portion of photoelectrode 630, separator, and counterelectrode 620, are provided within a first cavity or volume defined by terminal assembly member 610. In various embodiments, terminal assembly member 610 defines a second cavity or volume 660 at least partially separated from the first volume by a dividing wall 665. Terminal assembly member 610 may also be coupled at one end to a terminal end cap 670. In various embodiments, second volume 660 may be utilized to at least partially house wiring coupled to a terminal assembly (no shown) provided through one or more apertures in dividing wall 665. In various embodiments, the terminal assembly and apertures through which the assembly is provided are sealed to prevent various undesirables or other elements to entering or exiting through apertures in dividing wall 665.

In various embodiments, terminal end cap 670 defines an aperture adapted to receive and/or into which a wiring guide or connector 655 and/or wiring electrically coupled to one or more terminals 640/650 may be provided. In various embodiments, terminal assembly member 610 defines an inlet and/or an outlet. In various embodiments, a tubing or other adapter 480 is provided in the inlet/outlet defined by terminal assembly member 610.

In various embodiments, bulb assembly 500 is substantially provided in and coupled to housing 410 at first opposing end 440 of housing 410. In various embodiments, electrode assembly 600 is provided within housing 410 at or through second opposing end 430 of housing 410 such that photoelectrode 630 is provided at least partially around the light tube or sleeve 520 of bulb assembly 500. In various embodiments, bulb assembly 500 and electrode assembly 600 may be coupled to housing 410 in a variety of ways. For example, one or more of the assemblies may be screwed onto threads or grooves on housing 410.

In one or more examples of embodiments, photoelectrode 630 is provided around light tube or sleeve 520. In various embodiments, photoelectrode 630 is provided (e.g., around light tube or sleeve 520) to optimize (e.g., minimize) the distance or separation between photoelectrode 630 and the UV light and/or tube or sleeve 520. In various embodiments, photoelectrode 630 is provided closely around or near a surface of light tube or sleeve 520.

In one or more examples of embodiments, photoelectrode 630 (e.g., a foil photoelectrode) is provided around light tube or sleeve 520 such that a majority of the UV light (e.g., from the UV source within light tube or sleeve 520) is directed at or otherwise exposed to photoelectrode 630. In various embodiments, photoelectrode 630 is provided around light tube or sleeve 520, such that a substantial portion of the UV light is exposed to and/or directed at photoelectrode 630. In various embodiments, photoelectrode 630 is provided relatively close to light tube or sleeve 520 such that less than half (e.g., a relatively small percentage) of any volume of solution in or flowing through housing 420 of reactor or device 400 is exposed to light directly from the UV light or UV source.

In various embodiments, photoelectrode 630 is provided relative to light tube or sleeve 520 such that most of the volume of cavity 450 of reactor or device 400 is between photoelectrode 630 and wall or sidewall 420. In various embodiments, photoelectrode 630 is provided relative to light tube or sleeve 520 such that most of the average cross-sectional area of cavity 450 is between photoelectrode 630 and wall or sidewall 420. In various embodiments, photoelectrode 630 is provided relative to light tube or sleeve 520 such that the average cross-sectional area between photoelectrode 630 and wall or sidewall 420 is greater than the average cross-sectional area between photoelectrode 630 and light tube or sleeve 520.

In various embodiments, photoelectrode 630 is provided around light tube or sleeve 520 such that it is closer to light tube or sleeve 520 than to sidewall 420 (e.g., to help promote or facilitate flow of most of solution in space between photoelectrode 630 and sidewall(s) 420. In various embodiments, the average distance or spacing between a surface of photoelectrode 630 nearest light tube or sleeve 520 and a surface of light tube or sleeve 520 nearest photoelectrode 630 is less than one-half inch. In various embodiments, the average distance or spacing between photoelectrode 630 and light tube or sleeve 520 is less than three-eighths of an inch.

Figure 14:
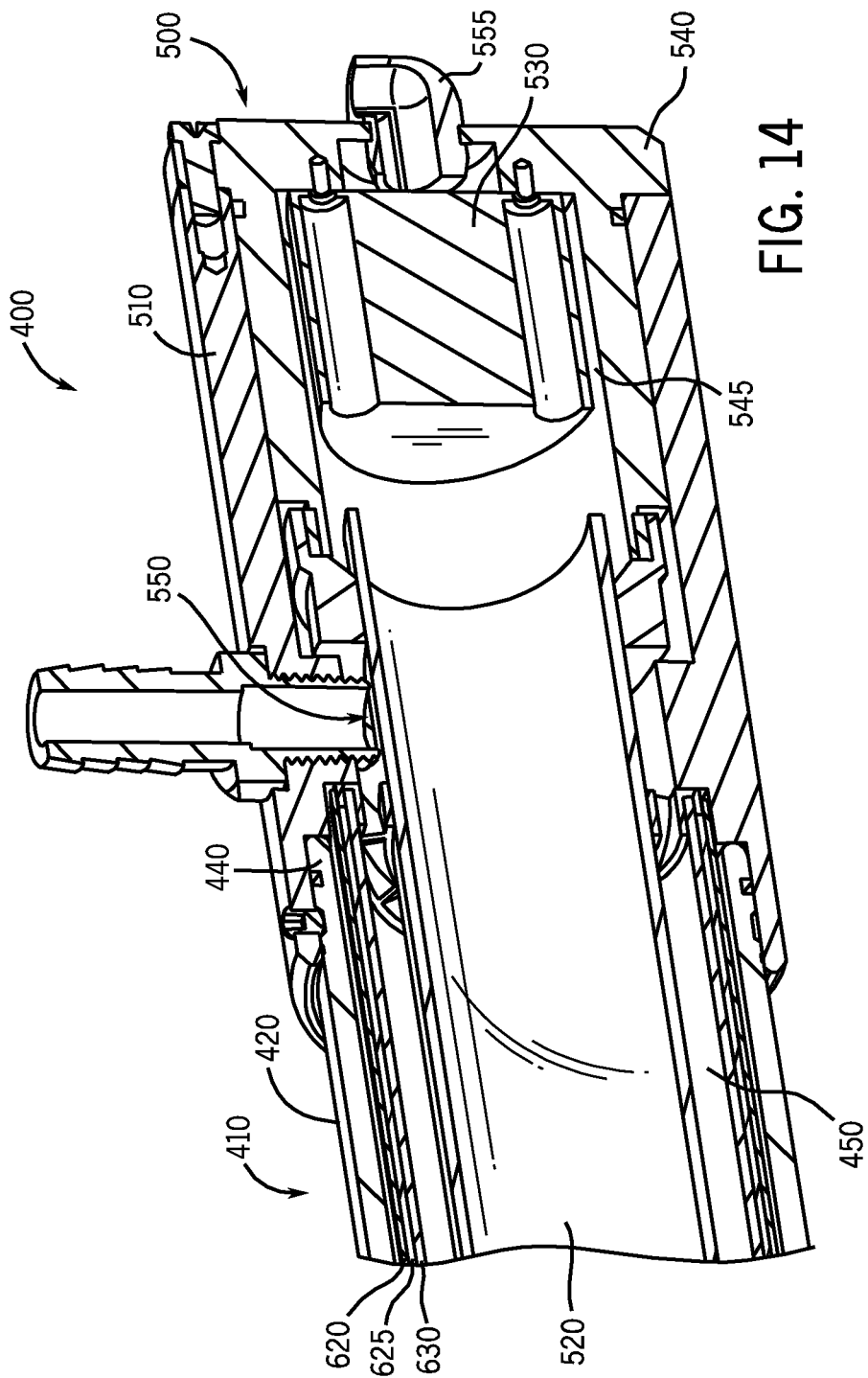
FIG. 14 is a partial cross-sectional view of a device or apparatus, according to one or more examples of embodiments.

As shown in FIG. 14, however, photoelectrode 630 may be spaced from light tube or sleeve 520. In various embodiments, photoelectrode 620 is provided relatively farther from light tube or sleeve 520 such that half or more of any volume of solution in or flowing through the housing of the reactor or device is exposed to light directly from the UV light or UV source.

In various embodiments, photoelectrode 630 is provided relative to light tube or sleeve 520 such that half or less of the volume of the cavity of the reactor or device is between photoelectrode 630 and wall or sidewall 420. In various embodiments, photoelectrode 630 is provided relative to light tube or sleeve 520 such that half or less of the average cross-sectional area of cavity 450 of the reactor or device 400 is between photoelectrode 630 and wall or sidewall 420. In various embodiments, photoelectrode 630 is provided relative to light tube or sleeve 520 such that the average cross-sectional area between photoelectrode 630 and wall or sidewall 420 is equal or less than the average cross-sectional area between photoelectrode 630 and light tube or sleeve 520. In various embodiments, a surface of light tube or sleeve 520 nearest photoelectrode 630 and a surface of photoelectrode 630 nearest light tube or sleeve 520 help define a first cross-sectional area and an opposing surface of photoelectrode 630 and a surface of the cavity wall define a second cross-sectional area, and wherein the first cross-sectional area is equal or larger than the second cross-sectional area. In various embodiments, the distance from the surface of photoelectrode 630 nearest light tube or sleeve 520 to the surface of light tube or sleeve 520 nearest photoelectrode 630 is more than the distance from the opposing surface of photoelectrode 630 to the surface of the cavity wall nearest photoelectrode 630.

In various embodiments, electrode assembly 600 also includes a spacer 700. An example of such a spacer is illustrated in FIGS. 15-18. As can be seen from FIGS. 15-18, spacer 700 includes an entrance end 710, an exit end 720 and a longitudinal axis running from entrance end 710 to exit end 720. In various embodiments, spacer 700 is divided into two concentric portions, peripheral concentric portion 730 and axial concentric portion 740. In various embodiments, peripheral concentric portion 730 is coupled to axial concentric portion 740 by one or more dividers 750. In various embodiments, dividers 750 and peripheral concentric portion 730 and axial concentric portion 740 form channels 760 through which a solution may flow (e.g., from entrance end 710 to exit end 720, or from exit end 720 to entrance end 710). In various embodiments, one or more dividers 750 are angled relative to the longitudinal axis of spacer 700. In various embodiments, one or more dividers 750 have alternative or varying cross-sectional shape from entrance end to exit end. In various embodiments, a groove 770 (e.g., a concentric groove) is defined by or otherwise provided in exit side 720 of peripheral concentric portion of spacer 700. In various embodiments, a flange 770 (e.g., a concentric flange) helps define groove 770.

Referring again to FIG. 14, in various embodiments, the axial concentric portion of spacer 700 is adapted to receive the light tube or sleeve. In various embodiments, the groove defined by the exit side of the peripheral concentric portion of spacer 700 is adapted to receive a portion or an edge of photoelectrode 620. In various embodiments, however, the groove defined by the exit side of the peripheral concentric portion of spacer 700 is adapted to receive a portion or an edge of photoelectrode 620 and a portion or an edge of separator 625. In various embodiments, counterelectrode 630 is provided around the outside of the flange. In various embodiments, the separator is also provided around the outside of the flange (e.g., sandwiched between the flange and the counterelectrode). In various embodiments, the flange of the spacer is adapted to help separate at least a portion of photoelectrode 620 and counterelectrode 630 (e.g., to prevent shorting or arcing near the edge of the electrode assembly) and otherwise protect at least a portion of photoelectrode 620 and/or counterelectrode 630 from being bent, damaged or otherwise compromised. In various embodiments, the one or more dividers are adapted to help direct, redirect, mix, stir or otherwise influence solution as it passes through the channels and/or the device. For example, the dividers may help to create a spiral flow of solution between photoelectrode 620 and light tube or sleeve 520. Such mixing or flow may be advantageous in many ways. For example, such mixing or flow may help to mix oxidants generated by the device into the solution. As another example, such mixing or flow may increase the residence time of the solution in the cavity of the device for even a solution of moderate velocity. It should also be noted that, while the spacer is shown near an end of electrode assembly, it or any number of spacers or modified spacers (e.g. spacers not having a flange or groove) may be utilized anywhere along photoelectrode 620 and/or light tube or sleeve 520.

Referring again to and as shown in FIGS. 7-11, in various embodiments, apparatus or device 400 includes housing or control box 700. In various embodiments, control box 700 may house various components of the apparatus or device 400. For example, in various embodiments, control box 700 houses one or more power supplies. In various embodiments, control box 700 houses one or more controls, circuits or switches which may be utilized to operate apparatus or device and its components. In various embodiments, control box 700 includes one or more circuits (e.g., an H circuit), switches (e.g., a MOSFET) or other devices for reversing a potential or bias across photoelectrode 630 and/or counterelectrode 620. In various embodiments, control box 700 includes a door or other component or aperture for ease of accessing components housed within control box 700. Control box 700 may be provided with locks and/or handles or other hardware.

In various embodiments, control box 700 includes or defines a first connector 720. In various embodiments, control box 700 includes or defines a second connectors 710. For example, one or more connectors 710/720 may be coupled to or provided through control box 700 to allow internal components of control box 700 to be electrically coupled to one or more device or apparatus 400 components provided externally to control box 700. For example, in various embodiments, control box 700 includes or defines at least one connector 710 through which wiring is or may be provided or coupled for electrically coupling electrodes 620/630 within a device or apparatus 400 to one or more power supplies provided in control box 700. In various embodiments, the circuits, switches or other such devices are housed in control box 700 and electrically connected or coupled to components of the unit 400 (e.g. a photoelectrode, counterelectrode and/or terminals). In one or more examples of embodiments, increasing the applied voltage (e.g., to the electrodes) may increase photocurrent and chlorine production.

A power supply and/or at least one ballast may be provided in control box 700 for supplying power to a UV lamp and/or bulb assembly 500. The one or more power supplies in control box 700 may be an AC or DC power supply and may include a plurality of outputs. In one or more examples of embodiments, the power supply is a DC power supply. The power supply may be a mountable power supply which may be mounted to control box 700. Preferably, the power supply is small in size, is durable or rugged, and provides power sufficient to operate at least one UV-lamp included in the apparatus and/or to supply an applied voltage or bias to the electrodes according to the described methods.

The power supply or an additional power supply may be connected to the terminals of the electrodes described hereinabove via, for example cable connection to the terminals, for providing a current, potential, voltage or bias to the electrodes as described in the described methods.

In various embodiments, control box includes one or more visual displays. For example, in various embodiments, control box includes a voltage display 730. In various embodiments, control box includes a current display 740. One or more of the displays may also display other information. Further, one or more of the displays may display real-time information.

In various embodiments, the device may also include a potentiostat, and a reference electrode in electrical communication with the potentiostat. In one or more examples of embodiments, the device further comprises a reference electrode and a voltage control device, such as a potentiostat, adapted to voltage or constant current between the reference electrode and the photoelectrode. In various embodiments, the housing member is adapted to house the reference electrode.

In one or more examples of embodiments, the device further comprises a semi-micro saline bridge member connecting the potentiostat and reference electrode, whereby housing 110 member is adapted to house the saline bridge.

In one or more examples of embodiments, the reference electrode is constructed from silver and is in the shape of a wire.

In one or more examples of embodiments, the potential on the photoelectrode is held constant relative to a saturated calomel reference electrode by potentiostat, such as EG&G Model 6310. In various embodiments, the potentiostat is connected to the reference electrode through a semi-micro saline bridge, such as available from EG&G, Model K0065. The saline bridge may be disposed inside the reactor close to photoelectrode. The current passing through the PECO device may be measured.

In various embodiments, the instant potentiostat is a variable current source that can measure a voltage between two electrodes. The potentiostat can perform a wide variety of electrochemical functions, but the two example functional modes are constant current and constant voltage. In constant current mode, the potentiostat supplies a user specified or predetermined current to the electrodes. In constant voltage mode, it supplies current to the electrodes while monitoring the voltage. It can then continually adjust the current such that the voltage will remain constant at a user specified value. A potentiostat can also be configured to supply pulses.

A temperature probe(s) may also be provided in one or more examples of embodiments. The temperature probe(s) may be positioned in the container and/or in the inner box. The temperature probe may monitor the temperature in the container or in the box or in the fluid within the respective container or box and communicate that temperature reading. Further the temperature probe may be in communication with a shut-off switch or valve which is adapted to shut the system down upon reaching a predetermined temperature.

A fluid level sensor(s) may also be provided which may communicate a fluid level reading. The fluid level sensor(s) may be positioned in the container and/or in the inner box. Further the fluid level sensor may be in communication with a shut-off switch or valve which is adapted to shut off the intake of fluid or engage or increase the outflow of fluid from the container upon reaching a predetermined fluid value.

In one or more examples of embodiments, the device includes a carbon filter adapted to filter chlorine from the water. In various embodiments, the device includes a computer adapted to send one or more controlled signals to the existing power supplies to pulse the voltage and current.

In operation of the foregoing example embodiment, contaminated fluid, such as contaminated water, may be pumped or otherwise provided or directed into the housing or container. The water may be circulated and/or recirculated within the housing or container. Multiple units, or reactors, may be connected and operated in series, which may result in increased space and time for contaminated fluid in the reactor(s) or device(s). Upon completion of processing, in various embodiments, the water exits the housing and container ready for use, or circulated or recirculated through the device, other device, or system of devices, for further treatment or purification.

In various embodiments, in operation, the $TiO_2$ photocatalyst is illuminated with light having sufficient near UV energy to generate reactive electrons and holes promoting oxidation of compounds on the anode surface.

Any temperature of aqueous solution or liquid water is suitable for use with the exemplary embodiments of the device such as the instant PECO devices. In various embodiments, the solution or water is sufficiently low in turbidity to permit sufficient UV light to illuminate the photoelectrode.

In various embodiments, photocatalytic efficiency is improved by applying a potential (i.e., bias) across the photoelectrode and counterelectrode. Applying a potential may decrease the recombination rate of photogenerated electrons and holes. In various embodiments, an effective voltage range applied may be in the range of −1 V to +15 V. In various embodiments, an electrical power source is adapted to apply an electrical potential in the range of 4 V to 12 V across the photoelectrode and counterelectrode. In various embodiments, the electrical power source is adapted to generate an electrical potential in the range of 1.2 V to 3.5 V across the photoelectrode and counterelectrode (or, 0 to 2.3 V vs. the reference electrode).

For various applications, including, for example fracking fluid or high-salinity applications, it may be desirable to reverse (e.g., periodically or intermittently) the potential, bias, polarity and/or current applied to or between the photoelectrode and the counterelectrode (e.g., to clean the photoelectrode and/or counterelectrode, or to otherwise improve the performance of the photoelectrode, counterelectrode, or device). In various embodiments, by reversing the potential, bias, polarity and/or current, the photoelectrode is changed (e.g. from an anode) into a cathode and the counterelectrode is changed (e.g. from a cathode) into an anode.

For example, in various embodiments, initially positive voltage is electrically connected to a positive charge electrode and negative voltage is electrically connected to a negative charge electrode. After a first period of time, the positive voltage is electrically connected to the negative charge electrode and the negative voltage is electrically connected to the positive charge electrode. After a second period of time, the positive voltage is electrically connected back to the positive charge electrode and the negative voltage is electrically connected back to the negative charge electrode. This reversal process may be repeated as necessary or desired.

The length of the first period of time and the second period of time may be the same. In various embodiments, however, the length of the first period of time and the second period of time are different. In various embodiments, the first period of time is longer than the second period of time.

The length of the first and second periods of time depends on a variety of factors including salinity, application, voltage, etc. For example, fracking fluid or high salinity fluid applications may require relatively more frequent reversal of potential, bias, polarity and/or current compared to fresh water applications. In various embodiments, the lengths of the first period of time relative to the second period of time may be in a ratio of from 3:1 to 50:1, and in one or more further embodiments from 3:1 to 25:1, and in one or more further embodiments from 3:1 to 7:1. For example, in various embodiments, the first period of time and second period of time is about 5 minutes to about 1 minute. Fresh water applications may require relatively less frequent reversal of potential, bias, polarity and/or current, and the lengths of the first period of time relative to the second period of time may be in a ratio of from 100:1 to 10:1. For example, in various embodiments, the first period of time and second period of time is about 60 minutes to a range of about 1 minute to about 5 minutes.

In various embodiments, the voltage applied between the photoelectrode and counterelectrode may not change during the first period of time of normal potential and during the second period of time of reverse potential. For example, in various embodiments (e.g., where the photoelectrode includes titanium and the apparatus and/or method are adapted for treatment of fracking or other high salinity solution) the voltage applied during the first period of time may be less than 9V (e.g., about 7.5V) and the voltage applied during the second period of time may be less than 9V (e.g., about 7.5V). In other various embodiments (e.g., where the photoelectrode includes titanium and the apparatus and/or method are adapted for treatment of fresh water) the voltage applied during the first period of time may be greater than 9V (e.g., about 12V) and the voltage applied during the second period of time may be greater than 9V (e.g., about 12V).

Maintaining the voltage in the first period of time and the second period of time may help to maintain and/or un-foul the photoelectrode to help make it more effective for removing contaminants through photoelectrocatalytic oxidation during the first period of time. However, maintaining the voltage under 9V in each period of time may cause a momentary disturbance in the removal of contaminants during the second period of time. For a variety of reasons, (e.g., to help minimize any such disturbance and/or to help cause electroprecipitation and/or electrocoagulation), in various embodiments, it may be advantageous to apply higher voltages (e.g. voltages greater than 9V) during the first period of time and second period of time. In various embodiments, applying higher voltages helps to promote an electrochemical process such as electroprecipitation and/or electrocoagulation during the second period of time, which process can help minimize any disturbance in removal of contaminants during the second period of time as well as offer advantages and benefits of such a process.

In various embodiments, the voltage is adjusted to control the rate of dissolution of the electrode. In various examples of embodiments, the voltage applied during the first period of time may be more than 9V (e.g., about 12V) and the voltage applied during the second period of time may be more than 9V (e.g., about 12V). Higher voltages may help optimize the effectiveness of the device in certain ways. Higher voltages may also lead to electroprecipitation or electrocoagulation of contaminants within or from the fluid. However, such higher voltages may also lead to anodic dissolution such as pitting and other degradation of the photoelectrode and/or counterelectrode, which may necessitate more frequent servicing of the PECO device (e.g. replacement of the photoelectrode (e.g., the foil) and counterelectrode).

In various embodiments, it may be advantageous (e.g., to help limit any anodic dissolution, or pitting or other degradation of the photoelectrode) to apply relatively lower voltages during the first period of time and relatively higher voltages during the second period of time. In various embodiments, e.g., in a fracking fluid application using a photoelectrode and a counterelectrode including titanium, the voltage applied during the first period of time may be less than 9V (e.g., about 7.5V) and the voltage applied during the second period of time may be more than 9V (e.g., about 12V for fracking fluid or higher salinity applications, to about 14V for fresh water applications). In various embodiments, during application of relatively lower voltage during the first period of time, contaminants are degraded (or the removal of contaminants is promoted) by photoelectrocatalytic oxidation, and during application of a relatively higher voltage during the second period of time, contaminants are degraded (or the removal of contaminants is promoted) by an electrochemical process such as electroprecipitation and/or electrocoagulation.

In various embodiments, during the second period of time, the counterelectrode or sacrificial electrode of titanium is dissolved at least in part by anodic dissolution. It is believed that a range of coagulant species of hydroxides are formed (e.g. by electrolytic oxidation of the sacrificial counterelectrode), which hydroxides help destabilize and coagulate the suspended particles or precipitate and/or adsorb dissolved contaminants.

In various embodiments, it is advantageous to apply relatively higher voltages during the first period of time and relatively lower voltages during the second period of time. In various embodiments, the voltage applied during the first period of time is more than 9V (e.g., about 12V) and the voltage applied during the second period of time is less than 9V (e.g., about 7.5V).

In various embodiments, the main reaction occurring at the counterelectrodes or sacrificial electrodes during the second period of time (e.g., during polarity reversal) is dissolution:

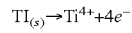
$$Ti_{(s)} \rightarrow Ti^{4+} + 4e^-$$

In addition, water is electrolyzed at the counterelectrode (or sacrificial electrode) and photoelectrode:

$$2H_2O + 2e^- \rightarrow H_{2(g)} + 2OH^- \text{ (cathodic reaction)}$$

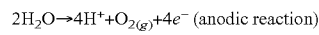
$$2H_2O \rightarrow 4H^+ + O_{2(g)} + 4e^- \text{ (anodic reaction)}$$

In various embodiments, electrochemical reduction of metal cations ($Me^{n+}$) occurs at the photoelectrode surface:

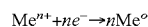
$$Me^{n+} + ne^- \rightarrow nMe^\circ$$

Higher oxidized metal compounds (e.g., Cr(VI)) may also be reduced (e.g. to Cr(III)) about the photoelectrode:

$$Cr_2O_7^{2-} + 6e^- + 7H_2O \rightarrow 2Cr^{3+} + 14OH^-$$

In various embodiments, hydroxide ions formed at the photoelectrode increase the pH of the solution which induces precipitation of metal ions as corresponding hydroxides and co-precipitation with metal (e.g. Ti) hydroxides:

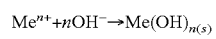
$$Me^{n+} + nOH^- \rightarrow Me(OH)_{n(s)}$$

In addition, anodic metal ions and hydroxide ions generated react in the solution to form various hydroxides and built up polymers:

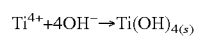
$$Ti^{4+} + 4OH^- \rightarrow Ti(OH)_{4(s)}$$

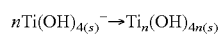
$$nTi(OH)_{4(s)} \rightarrow Ti_n(OH)_{4n(s)}$$

However, depending on the pH of the solution other ionic species may also be present. The suspended titanium hydroxides can help remove pollutants from the solution by sorption, co-precipitation or electrostatic attraction, and coagulation. For a particular electrical current flow in an electrolytic cell, the mass of metal (e.g. Ti) theoretically dissolved from the counterelectrode or sacrificial electrode is quantified by Faraday's law $$m = \frac{ItM}{zF}$$

where m is the amount of counterelectrode or sacrificial electrode material dissolved (g), I the current (A), t the electrolysis time (s), M the specific molecular weight (g mol$^{-1}$), z the number of electrons involved in the reaction and F is the Faraday's constant (96485.34 As mol$^{-1}$). The mass of evolved hydrogen and formed hydroxyl ions may also be calculated.

In various embodiments, it may be advantageous (e.g., to help limit any anodic dissolution, or pitting or other degradation of the photoelectrode) to apply certain voltages (e.g., relatively higher voltages) during the first period of time and different voltages (e.g., relatively lower voltages) during the second period of time. In various embodiments (e.g., in a fracking fluid application using a counterelectrode including aluminum), the voltage applied during the first period of time may be about 6V to 9V (e.g., about 7.5V) and the voltage applied during the second period of time may be about 0.6V-12V. In various embodiments, during application of relatively higher voltage during the first period of time, contaminants are degraded (or the removal of contaminants is promoted) by photoelectrocatalytic oxidation, and during application of a relatively lower voltage during the second period of time, contaminants are degraded (or the removal of contaminants is promoted) by and electrochemical process such electroprecipitation or electrocoagulation.

In various embodiments, during the second period of time, an aluminum counterelectrode or sacrificial electrode is dissolved at least in part by anodic dissolution. It is believed that a range of coagulant species of hydroxides are formed (e.g. by electrolytic oxidation of the sacrificial counterelectrode), which hydroxides help destabilize and coagulate the suspended particles or precipitate and/or adsorb dissolved contaminants.

In various embodiments, the main reaction occurring at the counterelectrodes or sacrificial electrodes during the second period of time (e.g., during polarity reversal) is dissolution:

$$Al_{(s)} \rightarrow Al^{3+} + 3e^-$$

Additionally, water is electrolyzed at the counterelectrode (or sacrificial electrode) and photoelectrode:

$$2H_2O + 2e^- \rightarrow H_{2(g)} + 2OH^- \text{ (cathodic reaction)}$$

$$2H_2O \rightarrow 4H^+ + O_{2(g)} + 4e^- \text{ (anodic reaction)}$$

In various embodiments, electrochemical reduction of metal cations (Me$^{n+}$) occurs at the photoelectrode surface:

$$Me^{n+} + ne^- \rightarrow nMe^\circ$$

Higher oxidized metal compounds (e.g., Cr(VI)) may also be reduced (e.g. to Cr(III)) about the photoelectrode:

$$Cr_2O_7^{2-} + 6e^- + 7H_2O \rightarrow 2Cr^{3+} + 14OH^-$$

In various embodiments, hydroxide ions formed at the photoelectrode increase the pH of the solution which induces precipitation of metal ions as corresponding hydroxides and co-precipitation with metal (e.g. Al) hydroxides:

$$Me^{n+} + nOH^- \rightarrow Me(OH)_{n(s)}$$

In addition, anodic metal ions and hydroxide ions generated react in the solution to form various hydroxides and built up polymers:

$$Al^{3+} + 3OH^- \rightarrow Al(OH)_{3(s)}$$

$$nAl(OH)_{3(s)}^- \rightarrow Al_n(OH)_{3n(s)}$$

However, depending on the pH of the solution other ionic species, such as dissolved Al(OH)$^{2+}$, Al$_2$(OH)$_2^{4+}$ and Al(OH)$_4^-$ hydroxo complexes may also be present. The suspended aluminum hydroxides can help remove pollutants from the solution by sorption, co-precipitation or electrostatic attraction, and coagulation.

For a particular electrical current flow in an electrolytic cell, the mass of metal (e.g. Al) theoretically dissolved from the counterelectrode or sacrificial electrode is quantified by Faraday's law $$m = \frac{ItM}{zF}$$

where m is the amount of counterelectrode or sacrificial electrode material dissolved (g), I the current (A), t the electrolysis time (s), M the specific molecular weight (g mol$^{-1}$), z the number of electrons involved in the reaction and F is the Faraday's constant (96485.34 As mol$^{-1}$). The mass of evolved hydrogen and formed hydroxyl ions may also be calculated.

The present invention, in one or more examples of embodiments, is directed to methods of treating an aqueous solution having one or more contaminants therein to help remove or reduce the amounts of contaminants. In various embodiments, the method includes providing an aqueous solution comprising at least one contaminant selected from the group consisting of an organism, an organic chemical, an inorganic chemical, and combinations thereof and exposing the aqueous solution to photoelectrocatalytic oxidization.

In one example of an application of the device described herein, the device uses photoelectrocatalysis as a treatment method for fracking fluid. While typically described herein as reducing or removing contaminants from fracking fluid, it should be understood by one skilled in the art that photoelectrocatalysis of other contaminants can be performed similarly using the device (e.g., photoelectrocatalytic oxidation or PECO device).

Generally, the method for reducing amount of contaminants in solution or fluid described includes introducing the solution into a housing or container or cell including: a UV light; a photoelectrode, wherein the photoelectrode comprises an anatase polymorph of titanium, a rutile polymorph of titanium, or a nanoporous film of titanium dioxide; and a cathode. The photoelectrode is irradiated with UV light, and a first potential is applied to the photoelectrode and counterelectrode for a first period of time. In various embodiments, a second potential is applied to the photoelectrode and counterelectrode for a second period of time. As a result, the contaminant amount in solution is reduced.

In various embodiments, one or more contaminants are oxidized by a free radical produced by a photoelectrode, and wherein one or more contaminants are altered electrochemically (e.g. by electroprecipitation or electrocoagulation). In various embodiments, one or more contaminants are oxidized by a chlorine atom produced by a photoelectrode. In various embodiments, one or more contaminants are altered electrochemically (e.g. by electroprecipitation or electrocoagulation).

In one or more embodiments, the apparatus and methods utilize photoelectrocatalytic oxidation, whereby a photocatalytic anode is combined with a counterelectrode to form an electrolytic cell. In various embodiments, when the instant anode is illuminated by UV light, its surface becomes highly oxidative. By controlling variables including, without limitation, chloride concentration, light intensity, pH and applied potential, the irradiated and biased TiO$_2$ composite photoelectrode may selectively oxidize contaminants that come into contact with the surface, forming less harmful gas or other compounds. In various embodiments, application of a potential to the photoelectrode provides further control over the oxidation products. Periodic or intermittent reversal of the potential may help further remove or reduce the amount of contaminants.

The foregoing apparatus and method provides various advantages. The device may be provided in a portable container, permitting on-site water or fluid decontamination. Further, the device is modular in design and can be easily combined with other devices as needed. The device is also easy to fabricate and includes electrical connections which are easy to make. In the apparatus described, the cathode is positioned behind the anode and away from the scouring action of water flow, reducing or limiting scale accumulation. Additionally, the spacer or separator provided between the counterelectrode and photoelectrode reduces shorting caused by contact or proximity of the electrode. These and other advantages are apparent from the foregoing description and associated Figures.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

We claim:

1. An apparatus for removing or reducing the level of contaminants in a solution comprising:
    a housing having first opposing end and a second opposing end and at least partially defining a cavity adapted to receive a solution, the cavity having a cavity length;
    a light tube provided within the housing and further defining the cavity and adapted to help disburse or otherwise provide ultraviolet radiation over most of the cavity length;
    a photoelectrode having a length and provided around the light tube; a counterelectrode having a length and provided within the cavity between the photoelectrode and the housing, and
    an electrical short-preventing separator provided within the cavity between the photoelectrode and counterelectrode;
wherein the photoelectrode comprises a primarily titanium foil support with a layer of titanium dioxide provided on at least one surface the photoelectrode;
wherein the electrical short-preventing separator extends at least substantially the length of at least one of the photoelectrode and counterelectrode; and
wherein the photoelectrode and counterelectrode are each coupled to a respective terminal adapted to be electrically coupled to a power supply.

2. The apparatus of claim 1, further comprising a first end assembly member coupled to the first opposing end of the housing and further defining the cavity.

3. The apparatus of claim 2, further comprising a second end assembly member coupled to the second opposing end of the housing and further defining the cavity.

4. The apparatus of claim 3, wherein the first end assembly member defines an inlet aperture into the cavity.

5. The apparatus of claim 4, wherein the second end assembly member defines an outlet aperture into the cavity.

6. The apparatus of claim 1, wherein the light tube defines a light tube cavity adapted to at least partially receive an ultraviolet light source.

7. The apparatus of claim 6, wherein an ultraviolet light source is provided within the light tube cavity.

8. The apparatus of claim 1, wherein the photoelectrode and the terminal coupled thereto and the counterelectrode and the terminal coupled thereto are removably coupled to a terminal assembly member, and the electrical short-preventing separator is provided between the photoelectrode and counterelectrode to form an electrode assembly.

9. The apparatus of claim 8, wherein the electrode assembly is removably coupled to the housing.

10. The apparatus of claim 8, wherein the electrode assembly further comprises a spacer, the spacer comprising a peripheral concentric portion coupled to an axial concentric portion by at least one divider.

11. The apparatus of claim 10, wherein the peripheral concentric portion defines a concentric groove therein adapted to receive a portion of the photoelectrode.

12. The apparatus of claim 10, wherein the spacer further comprises an entrance end, an exit end, and a longitudinal axis running from entrance end to exit end.

13. The apparatus of claim 12, wherein the at least one divider is angled relative to the longitudinal axis.

14. The apparatus of claim 1, wherein the light tube is coupled to a bulb end cap, which bulb end cap defines a cavity adapted to receive a bulb socket, and which bulb end cap is coupled to a bulb assembly member to form a bulb assembly or module.

15. The apparatus of claim 14, wherein the bulb assembly or module is removably coupled to the housing.

16. The apparatus of claim 1, wherein the electrical short-preventing separator is in the form of a mesh.

17. An apparatus for removing or reducing the level of contaminants in a solution comprising:
   a housing at least partially defining a cavity having a cavity wall;
   a light tube provided within the housing and further defining the cavity and adapted to help disburse or otherwise provide ultraviolet radiation within the cavity;
   a photoelectrode provided around the light tube; a counterelectrode provided within a space between the photoelectrode and the housing, and an electrical short-preventing separator provided between the photoelectrode and counterelectrode and spaced apart from at least one of the photoelectrode and counterelectrode;
   wherein the photoelectrode comprises a primarily titanium foil support with a layer of titanium dioxide provided on at least one surface the photoelectrode; and
   wherein the photoelectrode and counterelectrode are each coupled to a respective terminal adapted to be electrically coupled to a power supply.

18. The apparatus of claim 17, wherein the cavity is adapted to receive a solution.

19. The apparatus of claim 17, wherein the photoelectrode has a length and the electrical short-preventing separator extends substantially the length of the photoelectrode.

20. The apparatus of claim 17, wherein the counterelectrode has a length and the electrical short-preventing separator extends substantially the length of the counterelectrode.

* * * * *